United States Patent
Tokuchi

(10) Patent No.: US 10,969,741 B2
(45) Date of Patent: Apr. 6, 2021

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 295 days.

(21) Appl. No.: 16/054,600

(22) Filed: Aug. 3, 2018

(65) Prior Publication Data

US 2019/0227488 A1 Jul. 25, 2019

(30) Foreign Application Priority Data

Jan. 23, 2018 (JP) .............................. JP2018-009009

(51) Int. Cl.
| | |
|---|---|
| G02B 26/08 | (2006.01) |
| G03H 1/02 | (2006.01) |
| G03H 1/00 | (2006.01) |
| G03B 21/28 | (2006.01) |
| G02B 30/56 | (2020.01) |

(52) U.S. Cl.
CPC .............. *G03H 1/02* (2013.01); *G02B 30/56* (2020.01); *G03B 21/28* (2013.01); *G03H 1/0005* (2013.01); *G03H 2001/0055* (2013.01); *G03H 2001/0212* (2013.01); *G03H 2001/0232* (2013.01)

(58) Field of Classification Search
CPC .................. G03H 1/02; G03H 1/0005; G03H 2001/0212; G03H 2001/0232; G03H 2001/0055; G02B 30/56; G03B 21/28
USPC ....................................... 359/196.1
See application file for complete search history.

(56) References Cited

U.S. PATENT DOCUMENTS

2010/0283838 A1* 11/2010 Tomisawa .......... G02B 27/0093
348/51

FOREIGN PATENT DOCUMENTS

| JP | 2017-062709 A | 3/2017 |
| JP | 2017-146564 A | 8/2017 |

* cited by examiner

*Primary Examiner* — Euncha P Cherry
(74) *Attorney, Agent, or Firm* — Oliff PLC

(57) ABSTRACT

An information processing apparatus includes a controller that controls formation of an image to be formed in air so that the image and a user do not overlap each other in a space.

15 Claims, 36 Drawing Sheets

BEFORE FORMATION

AFTER FORMATION

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-009009 filed Jan. 23, 2018.

BACKGROUND

(i) Technical Field

The present invention relates to an information processing apparatus, an information processing system, and a non-transitory computer readable medium storing a program.

(ii) Related Art

There is a technology in which light beams are crossed in the air to form an image at the intersection of the light beams. The image displayed by using this type of technology is also referred to as an aerial image.

SUMMARY

According to an aspect of the invention, there is provided an information processing apparatus including a controller that controls formation of an image to be formed in air so that the image and a user do not overlap each other in a space.

BRIEF DESCRIPTION OF THE DRAWINGS

Exemplary embodiments of the present invention will be described in detail based on the following figures, wherein:

FIGS. 2A and 2B illustrate the principle of an aerial image forming apparatus that forms an aerial image by causing light beams output from a display device to pass through a dedicated optical plate, in which FIG. 2A illustrates a positional relationship between each member and the aerial image and FIG. 2B illustrates a part of the sectional structure of the optical plate;

FIGS. 4A and 4B illustrate the principle of an aerial image forming apparatus that forms the aerial image by using a micromirror array having a structure in which minute rectangular holes that constitute a dihedral corner reflector are arrayed in a plane at regular intervals, in which FIG. 4A illustrates a positional relationship between each member and the aerial image and FIG. 4B is an enlarged view of a part of the micromirror array;

DETAILED DESCRIPTION

Exemplary embodiments of the present invention are described below with reference to the drawings.

First Exemplary Embodiment

<Schematic Configuration of Aerial Image Forming System>

Figure 1:
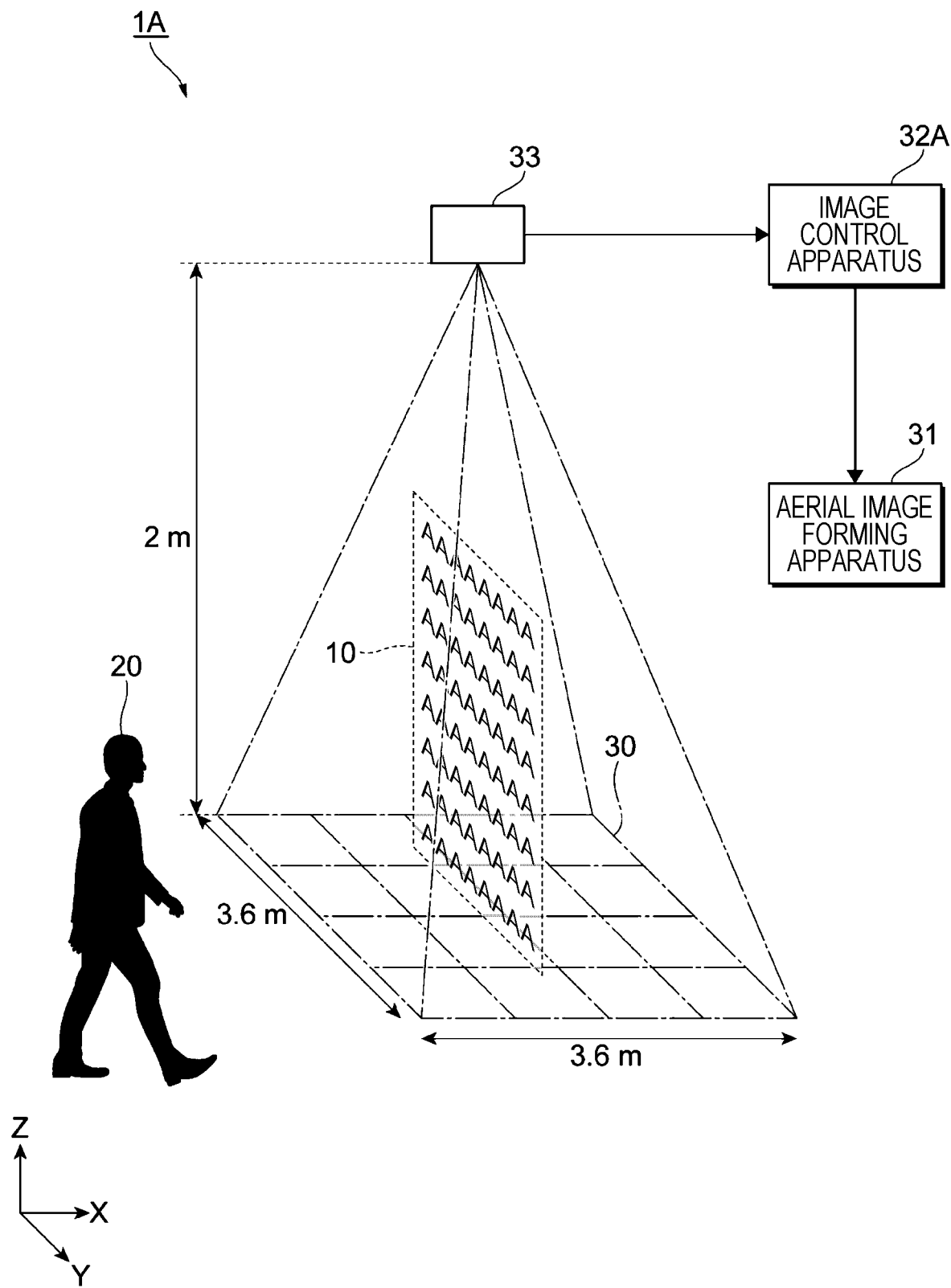
FIG. 1 illustrates the schematic configuration of an aerial image forming system according to a first exemplary embodiment.

FIG. 1 illustrates the schematic configuration of an aerial image forming system 1A according to a first exemplary embodiment. The aerial image forming system 1A is an example of an information processing system.

In this exemplary embodiment, an aerial image 10 is an image formed in the air so as to reproduce the state of light that is equivalent to light reflected from an object. The aerial image 10 is formed so as to float in the air and therefore a person may pass through the aerial image 10.

For example, the aerial image 10 shows a guidance or advertisement screen. For example, the aerial image 10 shows an operation screen for changing display contents in response to an operation performed by a person 20. Those screens are examples.

The aerial image 10 may show a moving image as well as a still image.

In each exemplary embodiment, the entire rectangle is rendered as the aerial image 10 but the shape that defines the outer edge of the aerial image 10 is not limited to the rectangle and any other shape may be used. For example, a space where an image of an object is formed may be set as the entire space where the aerial image 10 is formed. For example, an image of an operation button, an image of a person, an image of an animal, an image of a product, and an image of a fruit are examples of the aerial image 10. In FIG. 1, the shape of the aerial image 10 is a planar shape but may be a three-dimensional shape such as a curved shape, a spherical shape, or a cubic shape.

The aerial image 10 is visually recognized but is not a real object.

Therefore, a part of a human body may share the space where the aerial image 10 is formed.

In this exemplary embodiment, the state in which a part of a human body shares the space where the aerial image 10 is formed is referred to as a state in which a part of a human body overlaps the aerial image 10.

In the exemplary embodiments including this exemplary embodiment, the state in which a part of a human body overlaps the aerial image 10 includes a state that may be regarded as an overlap.

Each exemplary embodiment is also directed to suppression of a decrease in the visibility due to unintended approach of the person 20 to the aerial image 10. A strict overlap is merely a cause of the decrease in the visibility.

In each exemplary embodiment, every state in which the visibility decreases due to unintended approach is regarded as the state in which a part of a human body overlaps the aerial image 10.

For example, a state in which the distance between the aerial image 10 and a part of a human body is smaller than a predetermined reference value is regarded as the state in which a part of a human body overlaps the aerial image 10.

At this time, the reference value may be changed depending on the posture of the person 20. For example, the reference value may be set to 10 cm when the person 20 is standing in front of the display surface of the aerial image 10 in a posture in which the arms hang down on the sides. This value is an example. For example, the reference value may be 1 cm or 5 cm.

In each exemplary embodiment, an error or a margin is allowed in measurement and estimation of positions. Therefore, there is less necessity for a strict overlap as a precondition.

When a front side and a back side are set in the aerial image 10, a state in which the distance between the aerial image 10 and the person 20 located on the front side is smaller than the predetermined reference value may be regarded as the state in which a part of a human body overlaps the aerial image 10.

For example, the front side is a side where characters are recognized in a proper direction or a face is observed with its sides positioned properly. When the aerial image 10 is a three-dimensional image, the front side is a side where a surface defined as the front surface of the three-dimensional image is observed.

In this exemplary embodiment, a person detecting sensor 33 is used as a unit that detects an overlap between the aerial image 10 and the person 20 due to unintended approach.

In the case of this exemplary embodiment, for example, a thermopile infrared sensor (manufactured by, for example, OMRON Corporation; https://www.omron.co.jp/press/2017/09/c0912.html) is used as the person detecting sensor 33. The thermopile infrared sensor is a sensor that acquires an infrared image by using infrared sensors arranged in two-dimensional array.

The thermopile infrared sensor that is used in this exemplary embodiment is attached to a ceiling in the space where the aerial image 10 is formed to define a detection plane 30 of 3.6 m×3.6 m at a position that is 2 m below the ceiling. The thermopile infrared sensor detects the radiation temperature of the person 20 to detect the presence or absence of the person 20.

In the case of this exemplary embodiment, the person detecting sensor 33 may detect the presence or absence of the person 20 in each of 16 segmented areas of the detection plane 30. Since the detection plane 30 is segmented into 16 areas, one area measures 0.9 m×0.9 m. Thus, the positional relationship between the aerial image 10 and the person 20 is roughly identified.

The person detecting sensor 33 is not limited to the thermopile infrared sensor but may be, for example, a pyroelectric infrared sensor, a sensor that detects the presence or absence of an object that interrupts an infrared ray or the like (so-called optical sensor), an acoustic sensor that detects an object through a response of sound, a sensor that detects a load on a floor or mat, or an image capturing camera.

The person detecting sensor 33 is an example of a detector.

Depending on the type of sensor to be employed, plural person detecting sensors 33 are arranged in a target space.

The aerial image forming system 1A illustrated in FIG. 1 includes an aerial image forming apparatus 31 that forms the aerial image 10 in the air, an image control apparatus 32A that controls the aerial image forming apparatus 31, and the person detecting sensor 33 described above.

The aerial image forming apparatus 31 is an example of an image forming unit. The image control apparatus 32A is an example of a controller. The image control apparatus 32A is also an example of an information processing apparatus.

The image control apparatus 32A controls the formation of the aerial image 10 based on the positional relationship between the aerial image 10 and the person 20 to control how the aerial image 10 is viewed from the person 20 (visibility). In other words, the image control apparatus 32A controls the formation of the aerial image 10 so that the person 20 and the aerial image 10 do not overlap each other, thereby preventing the decrease in the visibility.

The image control apparatus 32A acquires information on the position of the person 20 based on a signal output from the person detecting sensor 33.

<Examples of Aerial Image Forming Apparatus>

The principles of formation of the aerial image 10 are described with reference to FIG. 2A to FIG. 6. All the principles described below are known principles.

Figure 2A:
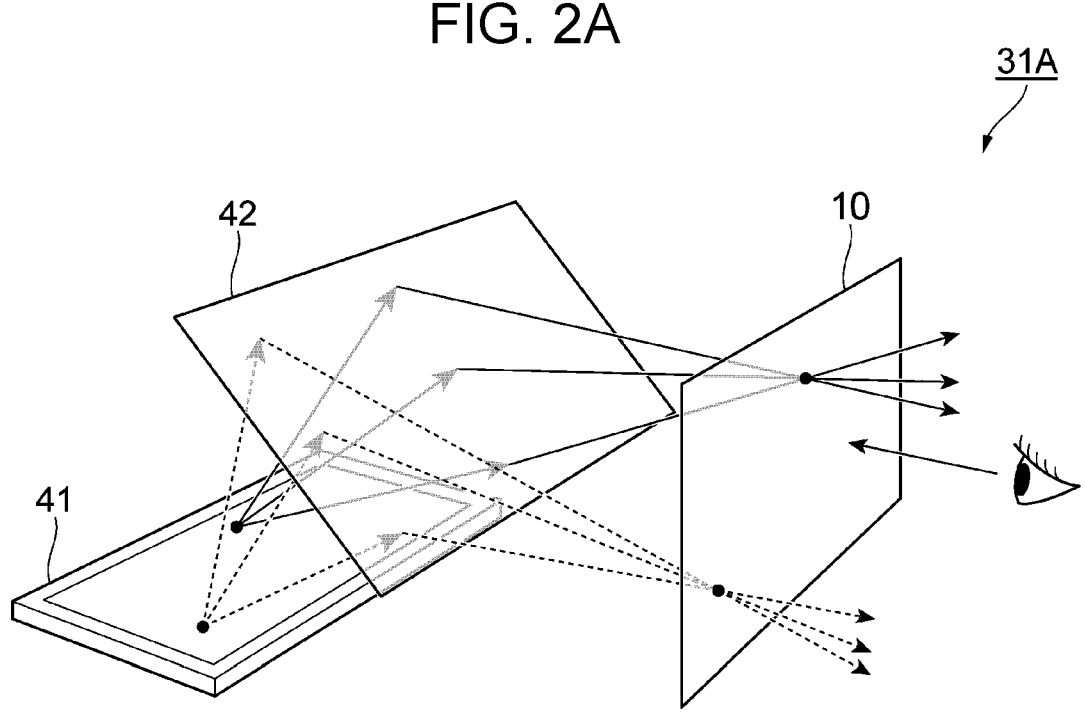
Figure 2B:
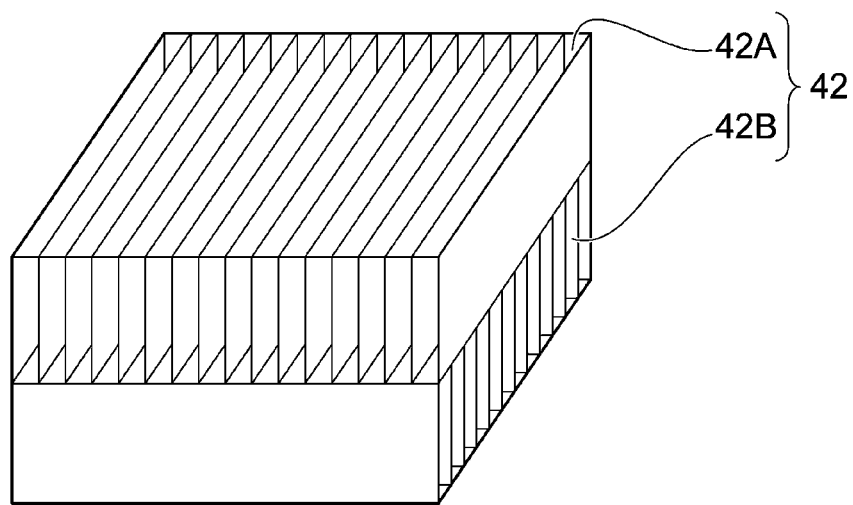

FIGS. 2A and 2B illustrate the principle of an aerial image forming apparatus 31A that forms the aerial image 10 by causing light beams output from a display device 41 to pass through a dedicated optical plate 42. FIG. 2A illustrates a positional relationship between each member and the aerial image 10. FIG. 2B illustrates a part of the sectional structure of the optical plate 42. The display device 41 and the optical plate 42 are examples of an optical component.

The optical plate 42 has a structure in which a plate having strips of glass 42A arrayed so that their wall surfaces are used as mirrors and a plate having strips of glass 42B arrayed in a direction orthogonal to the strips of glass 42A are stacked vertically.

The optical plate 42 reflects the light beams output from the display device 41 twice on the strips of glass 42A and 42B to form an image in the air. Thus, an image displayed on the display device 41 is reproduced in the air. The distance between the display device 41 and the optical plate 42 is equal to the distance between the optical plate 42 and the aerial image 10. The dimensions of the image displayed on the display device 41 are equal to the dimensions of the aerial image 10.

Figure 3:
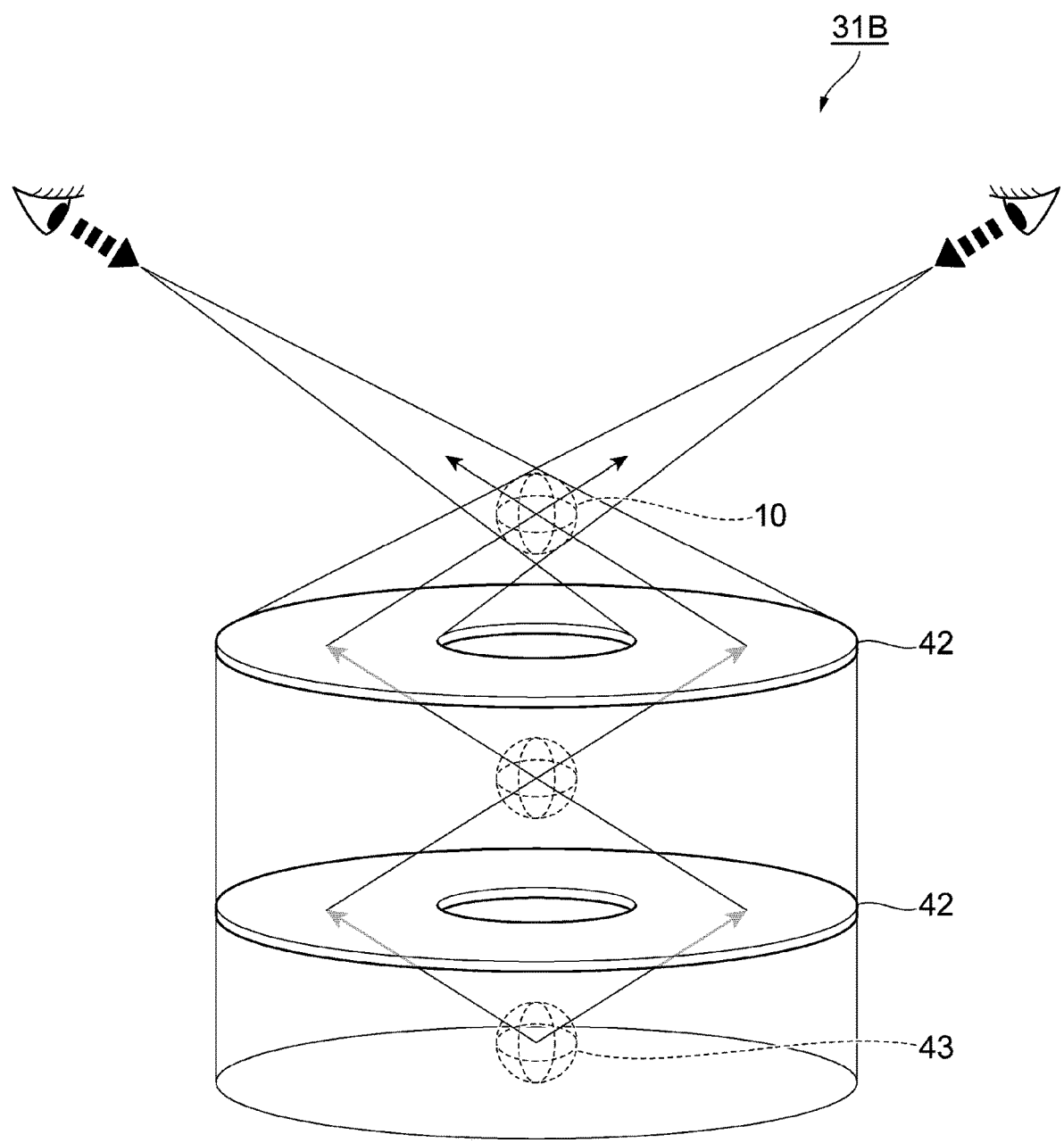
FIG. 3 illustrates the principle of an aerial image forming apparatus that forms a three-dimensional image as the aerial image.

FIG. 3 illustrates the principle of an aerial image forming apparatus 31B that forms a three-dimensional image as the aerial image 10. The aerial image forming apparatus 31B reproduces the three-dimensional image (aerial image 10) in the air by causing light beams reflected on the surface of a real object 43 to pass through ring-shaped optical plates 42 twice. The optical plates 42 need not be arranged in series.

Figure 4A:
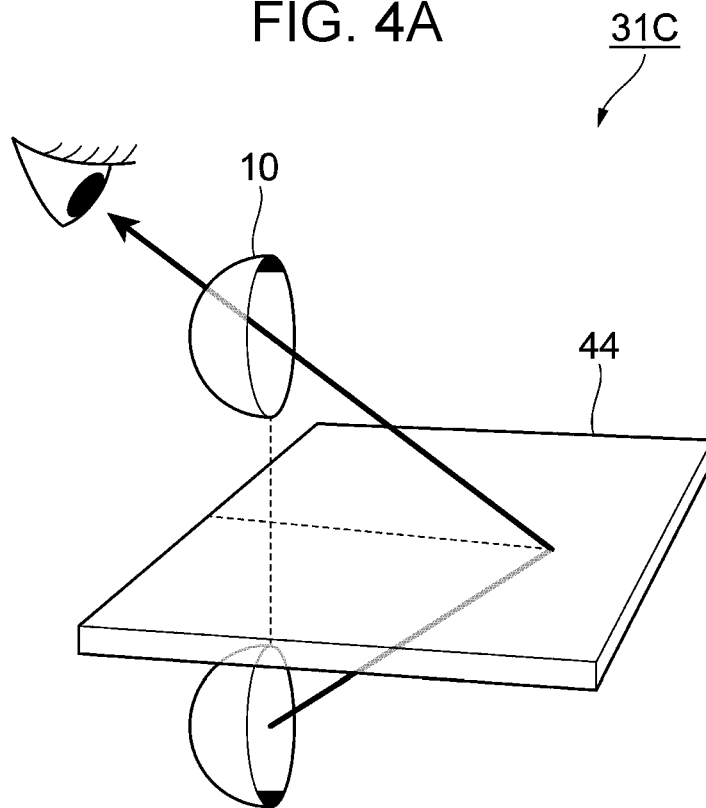
Figure 4B:
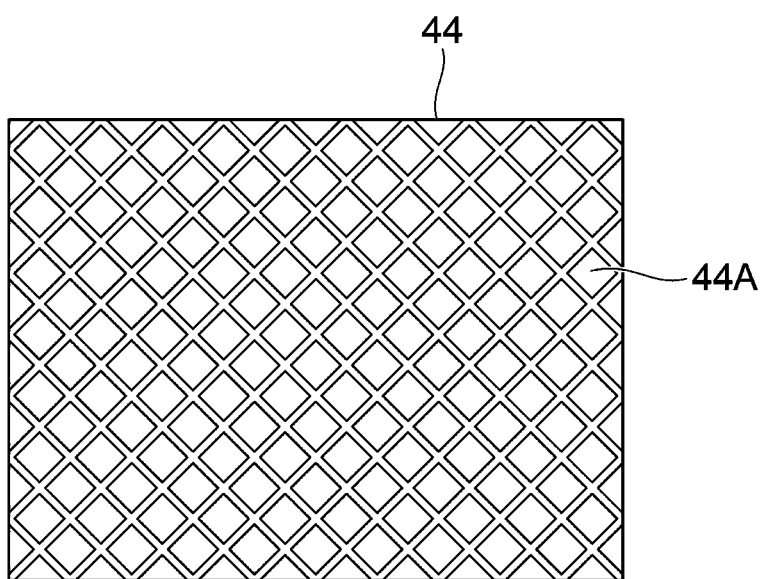

FIGS. 4A and 4B illustrate the principle of an aerial image forming apparatus 31C that forms the aerial image 10 by using a micromirror array 44 having a structure in which minute rectangular holes 44A that constitute a dihedral corner reflector are arrayed in a plane at regular intervals. FIG. 4A illustrates a positional relationship between each member and the aerial image 10. FIG. 4B is an enlarged view of a part of the micromirror array 44. For example, each hole 44A is formed at 100 µm square. The micromirror array 44 is an example of the optical component.

Figure 5:
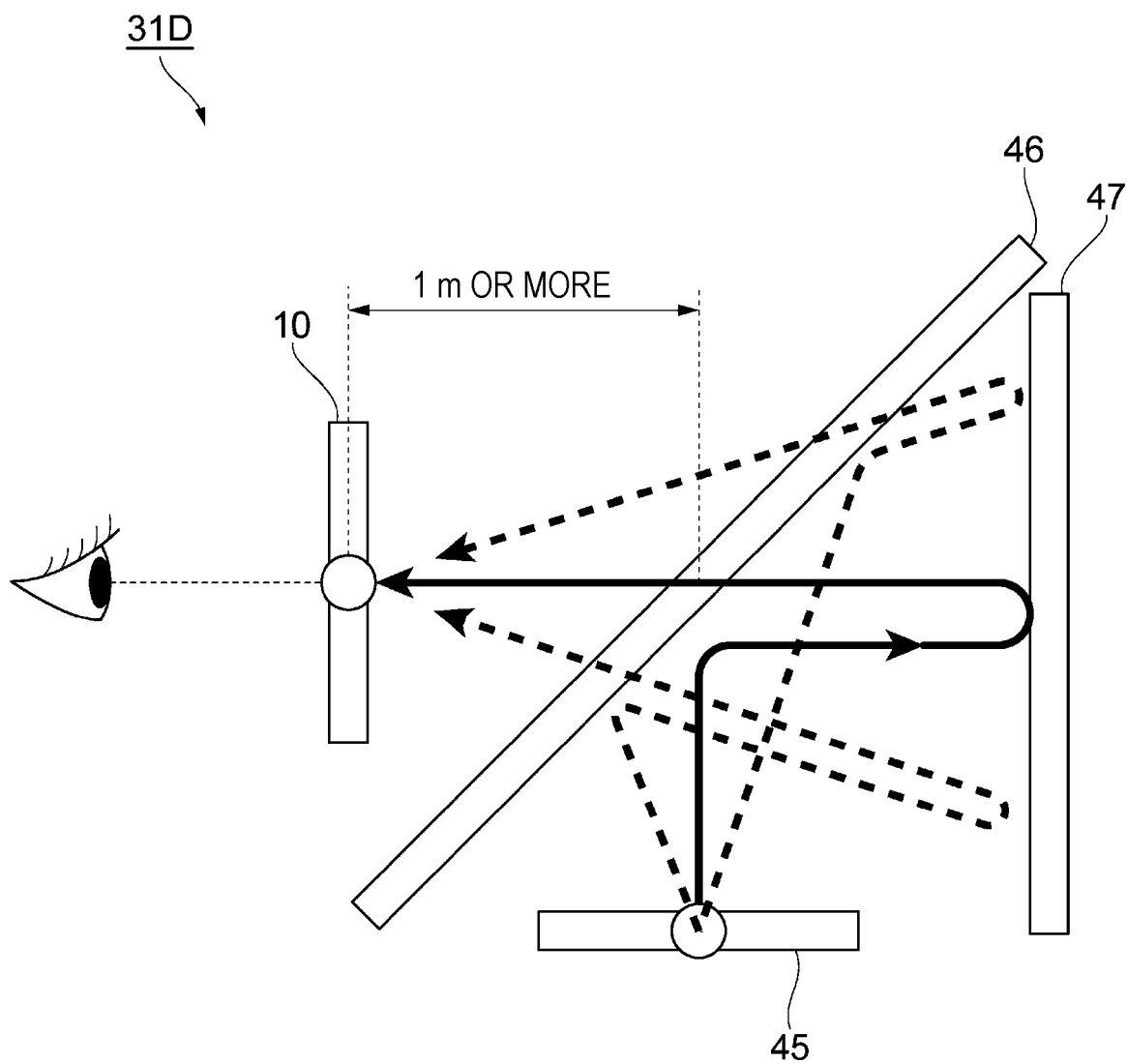
FIG. 5 illustrates the principle of an aerial image forming apparatus that uses a beam splitter and a retroreflective sheet.

FIG. 5 illustrates the principle of an aerial image forming apparatus 31D that uses a beam splitter 46 and a retroreflective sheet 47. The beam splitter 46 is arranged at an angle of 45° with respect to the display surface of a display device 45. The retroreflective sheet 47 is arranged at an angle of 90° with respect to the display surface of the display device 45 in a direction in which a display image is reflected by the beam splitter 46. The display device 45, the beam splitter 46, and the retroreflective sheet 47 are examples of the optical component.

In the case of the aerial image forming apparatus 31D, light beams output from the display device 45 are reflected by the beam splitter 46 in a direction to the retroreflective sheet 47 and then retroreflected by the retroreflective sheet 47. The light beams pass through the beam splitter 46 to form an image in the air. The aerial image 10 is formed at a position where the image is formed by the light beams.

Figure 6:
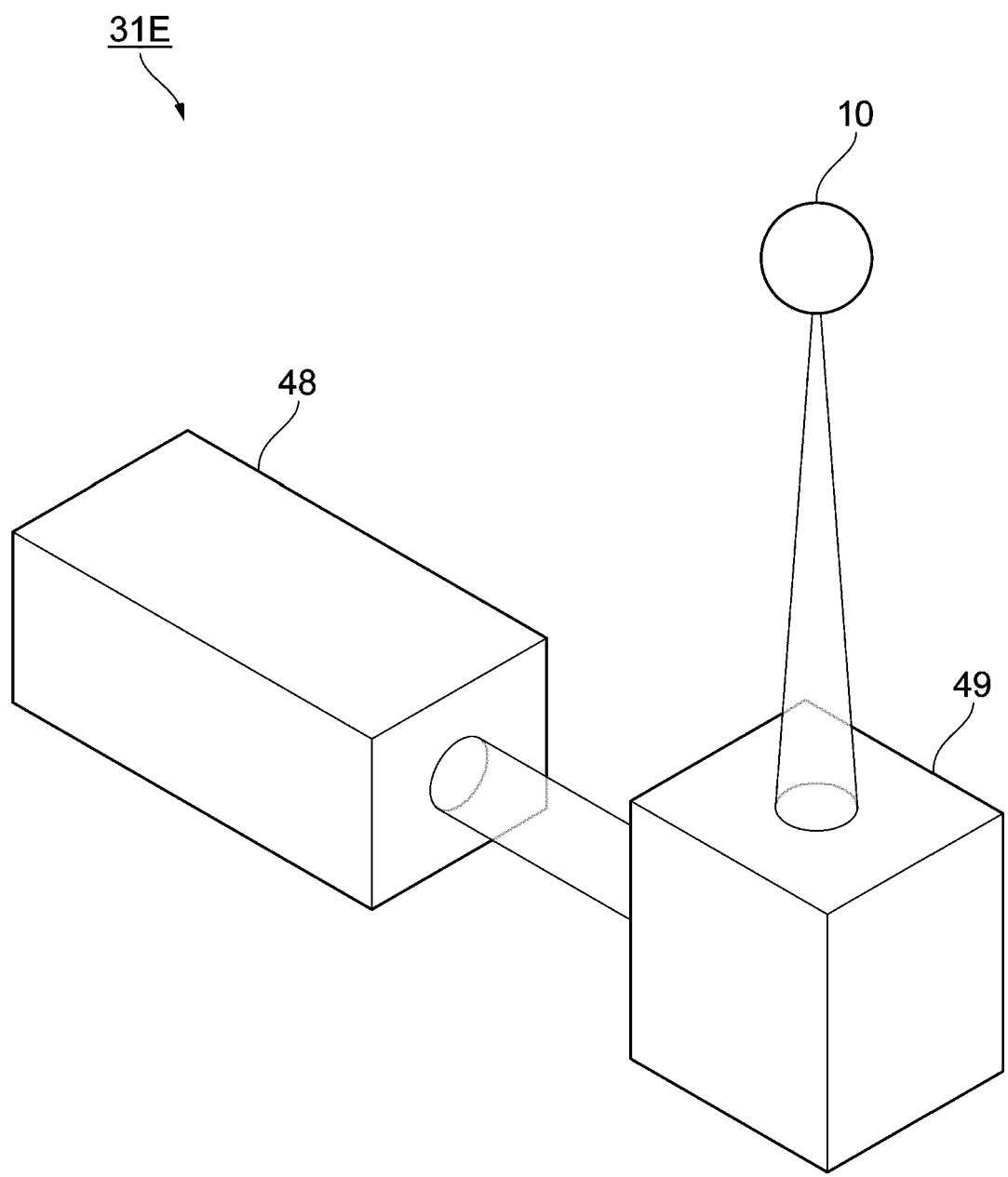
FIG. 6 illustrates the principle of an aerial image forming apparatus that forms the aerial image as an aggregate of plasma luminous bodies.

FIG. 6 illustrates the principle of an aerial image forming apparatus 31E that forms the aerial image 10 as an aggregate of plasma luminous bodies.

In the case of the aerial image forming apparatus 31E, an infrared pulse laser 48 outputs a pulsed laser beam and an XYZ scanner 49 condenses the pulsed laser beam in the air. At this time, gas near a focal point is instantaneously turned into plasma to emit light. For example, the pulse frequency is 100 Hz or lower. For example, the pulse emission time is of the order of nanoseconds. The infrared pulse laser 48 and the XYZ scanner 49 are examples of the optical component.

<Configuration of Image Control Apparatus 32A>

Figure 7:
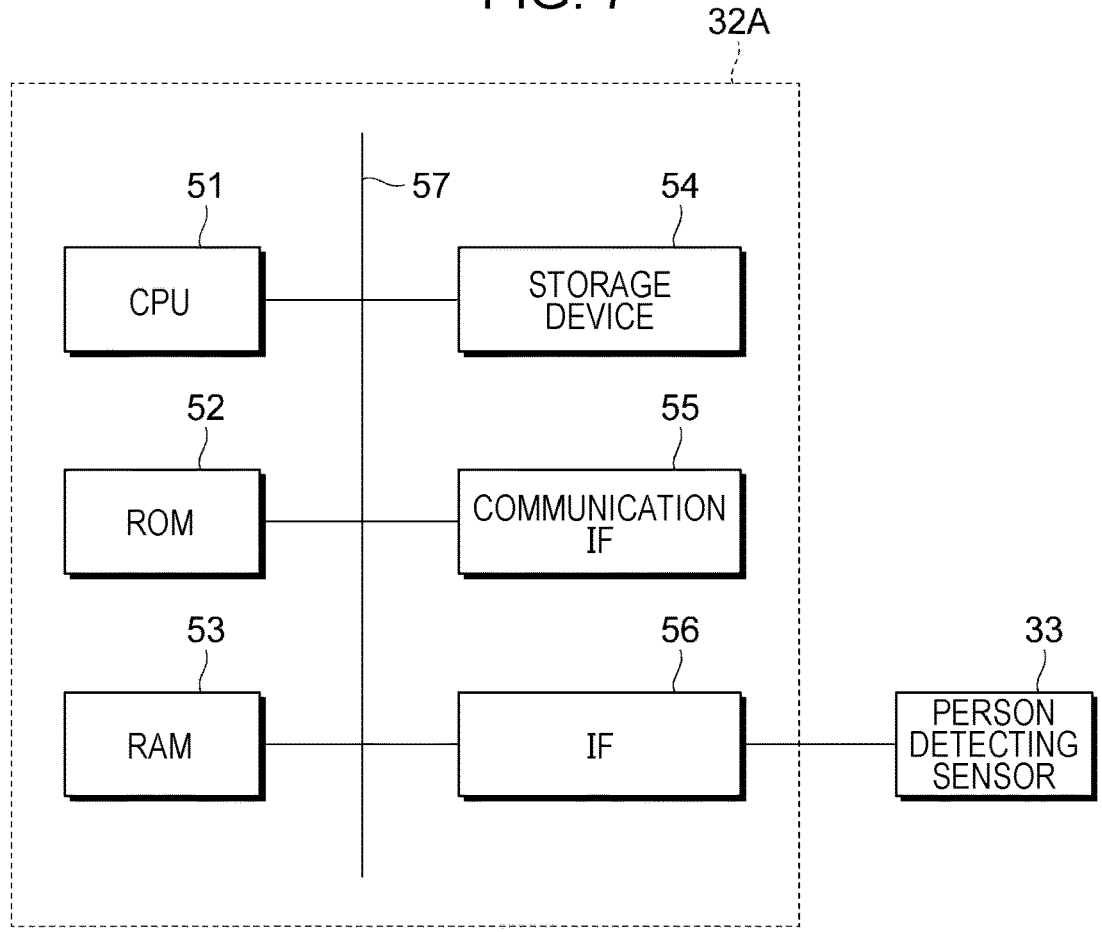
FIG. 7 illustrates an example of the hardware configuration of an image control apparatus according to the first exemplary embodiment.

FIG. 7 illustrates an example of the hardware configuration of the image control apparatus 32A according to the first exemplary embodiment.

The image control apparatus 32A includes a central processing unit (CPU) 51 that provides various functions through execution of firmware and application programs, a read only memory (ROM) 52, which is a storage area that stores the firmware and a basic input output system (BIOS), and a random access memory (RAM) 53, which is an area where the programs are executed. The CPU 51, the ROM 52, and the RAM 53 are examples of a so-called computer.

The image control apparatus 32A includes a storage device 54 that stores data of the application programs and the like. As the storage device 54, for example, a rewritable non-volatile storage medium is used for storing information.

The image control apparatus 32A controls the aerial image forming apparatus 31 by using a communication interface (communication IF) 55 to change the formation of the aerial image 10. The control includes control of the position where the aerial image 10 is formed and the dimensions of the aerial image 10.

The image control apparatus 32A communicates with the person detecting sensor 33 by using an interface (IF) 56.

The CPU 51 and the respective parts are connected to each other through a bus 57.

Figure 8:
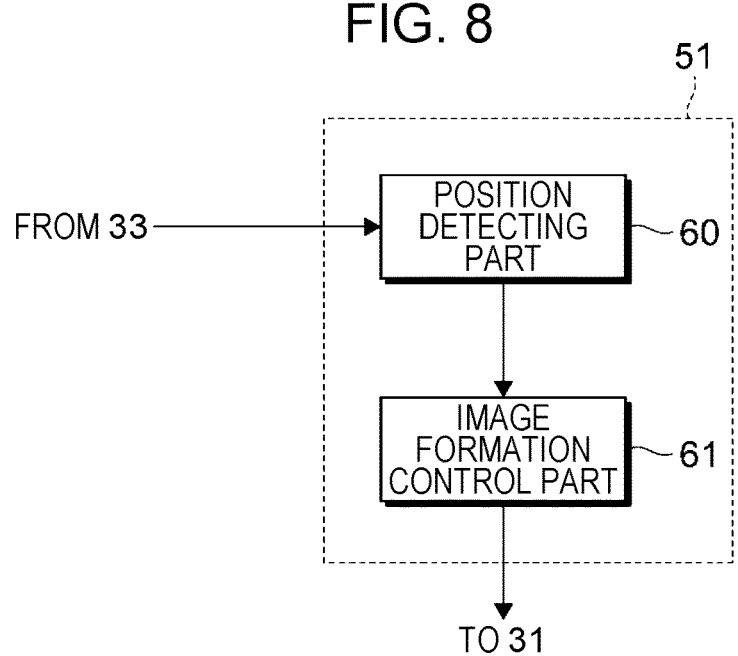
FIG. 8 illustrates an example of the functional configuration of the image control apparatus according to the first exemplary embodiment.

FIG. 8 illustrates an example of the functional configuration of the image control apparatus 32A (see FIG. 7) according to the first exemplary embodiment.

The functional configuration illustrated in FIG. 8 is implemented through execution of a program by the CPU 51 (see FIG. 7).

The CPU 51 functions as a position detecting part 60 that detects the position of the person 20 (see FIG. 1) in a space where the aerial image 10 (see FIG. 1) is formed, and an image formation control part 61 that controls the formation of the aerial image 10 based on a relationship between the detected position of the person 20 and the position (three-dimensional) where the aerial image 10 is formed.

The position detecting part 60 detects an area of the detection plane 30 (see FIG. 1) where the person 20 detected by the person detecting sensor 33 is located. The detection plane 30 is set so as to include the aerial image 10.

The image formation control part 61 has information (three-dimensional) on the space where the aerial image 10 is formed and information (two-dimensional) on the position where the detection plane 30 of the person detecting sensor 33 is defined. The information on the position where the aerial image 10 is formed may be estimated based on a control history from an initial position identified through positioning performed in advance, estimated through communication with the aerial image forming apparatus 31, or provided from other sensors.

When the space where the aerial image 10 is formed and the position of the person 20 overlap each other, the image formation control part 61 of this exemplary embodiment performs control so as to move the position where the aerial image 10 is formed.

In the case of this exemplary embodiment, examples of the movement to be used herein include a linear movement, a movement by rotation, a combination of linear movements, a combination of movements by rotation, and a combination of a linear movement and a movement by rotation.

<Processing Operation of Image Formation Control Part>

Figure 9:
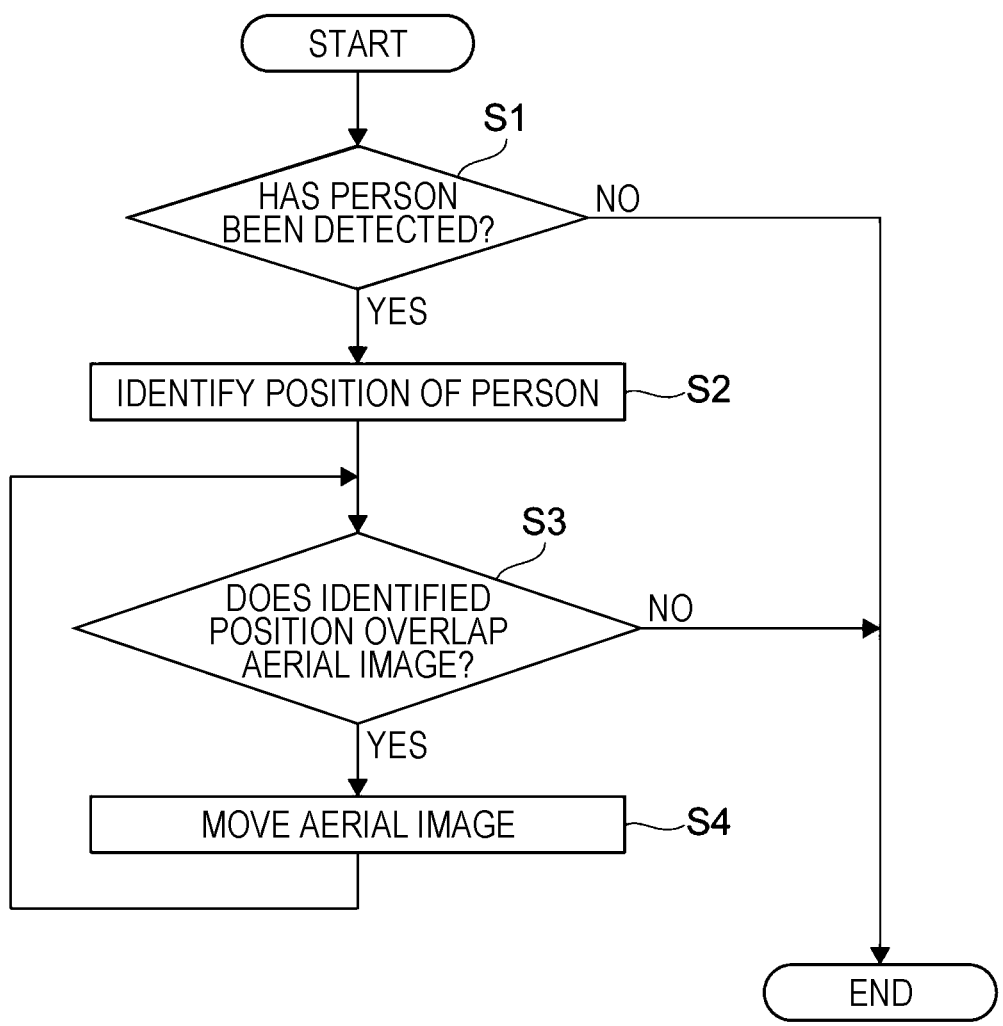
FIG. 9 is a flowchart for describing an overview of a processing operation to be executed by an image formation control part.

FIG. 9 is a flowchart for describing an overview of a processing operation to be executed by the image formation control part 61 (see FIG. 8). Because of the overview, details differ depending on individual styles of use.

First, the image formation control part 61 determines whether a person has been detected (Step S1).

When the result of Step S1 is NO, the image formation control part 61 terminates the processing. The image formation control part 61 may repeat the determination of Step S1 until a person is detected.

When the result of Step S1 is YES, the image formation control part 61 identifies the position of the person (Step S2). The position of the person may be identified as coordinates in the space, as any one of the areas that constitute the detection plane 30 (see FIG. 1), or as a position relative to the aerial image or the aerial image forming apparatus 31 (see FIG. 1). The position may be provided as two-dimensional information or as three-dimensional information.

Next, the image formation control part 61 determines whether the identified position overlaps an aerial image (Step S3).

The determination does not require precise detection of an overlap. For example, the determination may be made in consideration of a margin. The reason is that a purpose of executing this processing operation is to increase the visibility for a person. Another reason is that a strict overlap between the aerial image 10 and the person 20 is merely a cause of a decrease in the visibility.

When the result of Step S3 is NO, the image formation control part 61 terminates the processing. The reason is that there is no need to move the position where the aerial image 10 is formed.

When the result of Step S3 is YES, the image formation control part 61 moves the aerial image in a direction in which the aerial image does not overlap the person (Step S4).

This movement is repeated until the result of Step S3 becomes NO.

For example, the moving direction and the moving distance may be determined based on a relationship between the position where the aerial image is formed and the position of the person or a recommended distance for recognition. When the aerial image is a three-dimensional image, the thickness of the aerial image is also taken into consideration.

Examples of the movement of the aerial image include translation and rotation. In those movements, the dimensions of the aerial image are maintained.

For example, when the aerial image is formed by the method illustrated in FIGS. 2A and 2B, the display device 41 (see FIG. 2A) and the optical plate 42 (see FIG. 2A) are moved together in one direction by using a movement mechanism (not illustrated). Thus, the aerial image may be translated. Examples of the movement mechanism to be used herein include a single-axis actuator. The display device 41 and the optical plate 42 are moved along a guide mechanism. The moving distance and the position after the movement are detected by a position detecting sensor (not illustrated).

When the aerial image 10 is formed by the method illustrated in FIG. 3 or FIGS. 4A and 4B, the position of the real object may be moved. When the aerial image 10 is formed by the method illustrated in FIG. 5, the position of the display device 45 (see FIG. 5) may be moved parallel to the display surface. When the aerial image 10 is formed by the method illustrated in FIG. 6, the infrared pulse laser (see FIG. 6) and the XYZ scanner 49 (see FIG. 6) may be translated together.

When the aerial image 10 is formed by the method illustrated in FIGS. 2A and 2B, the display device 41 and the optical plate 42 are rotated together by using a rotation mechanism (not illustrated). Thus, the aerial image may be rotated. Examples of the rotation mechanism to be used herein include a motor. The display device 41 (see FIG. 2A) and the optical plate 42 (see FIG. 2A) are rotated together about a rotation axis. The rotation angle and the rotating direction are detected by a position detecting sensor (not illustrated). Depending on the rotating direction of the aerial image 10, the optical plate 42 may be rotated alone.

When the aerial image 10 is formed by the method illustrated in FIG. 3 or FIGS. 4A and 4B, the real object may be rotated. When the aerial image 10 is formed by the method illustrated in FIG. 5, the display device 45 (see FIG. 5) may be rotated. When the aerial image 10 is formed by the method illustrated in FIG. 6, there may be used a method for rotating the infrared pulse laser 48 (see FIG. 6) and the XYZ scanner 49 (see FIG. 6) together. Alternatively, coordinates to be provided to the XYZ scanner 49 may be changed to coordinates after the rotation.

<Movement Examples of Aerial Image 10>

Figure 10:
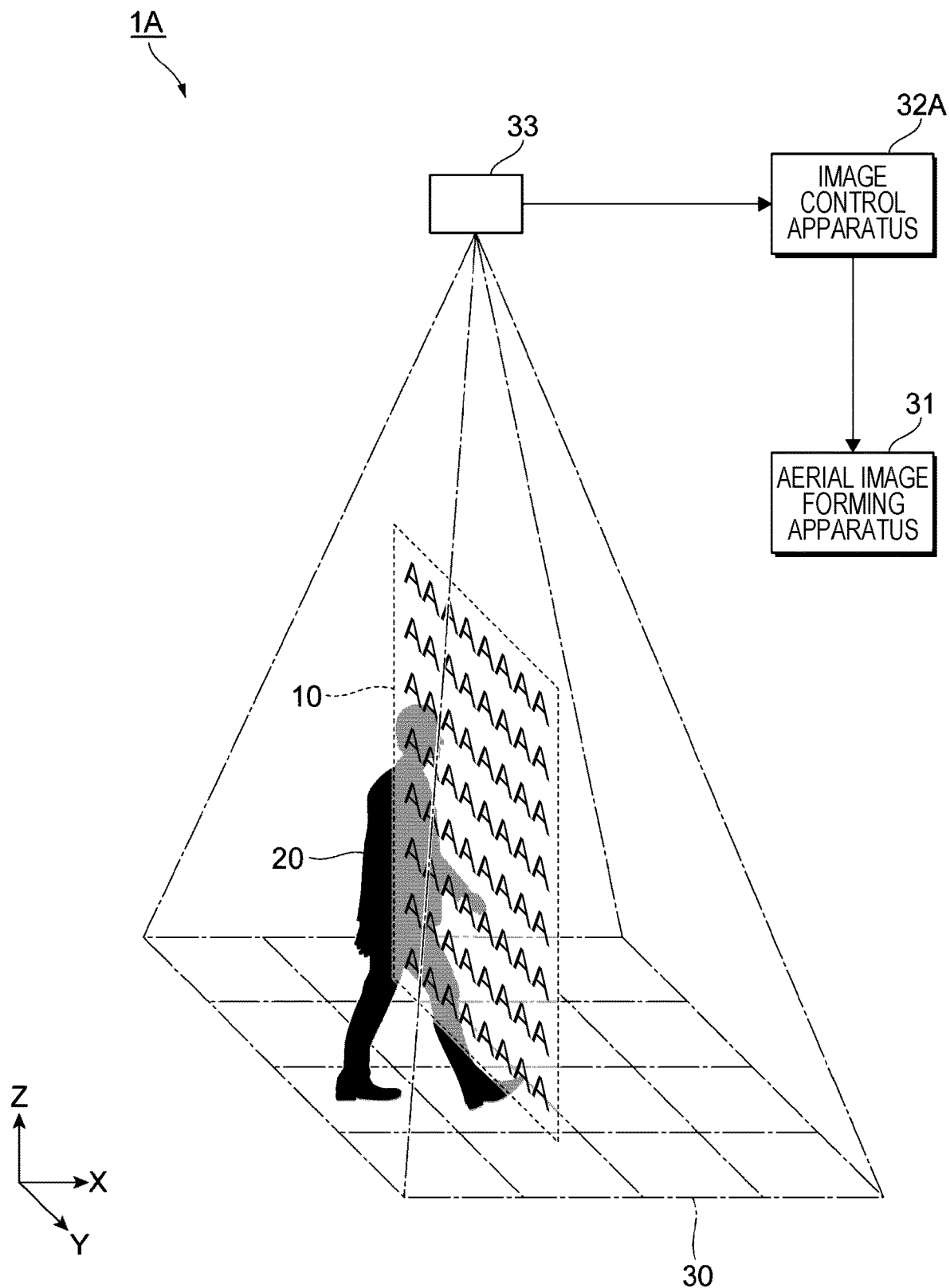
FIG. 10 illustrates an example of a state in which a person overlaps the aerial image.

FIG. 10 illustrates an example of a state in which the person 20 overlaps the aerial image 10.

In FIG. 10, parts corresponding to those in FIG. 1 are denoted by the same reference symbols.

In the case of FIG. 10, the back of the person 20 is located on one side of the aerial image 10 and the face of the person 20 is located on the other side of the aerial image 10. That is, the front side of the body has passed through the aerial image 10.

In this state, the person 20 fails to recognize the display contents of the aerial image 10.

Movement Example 1

Figure 11:
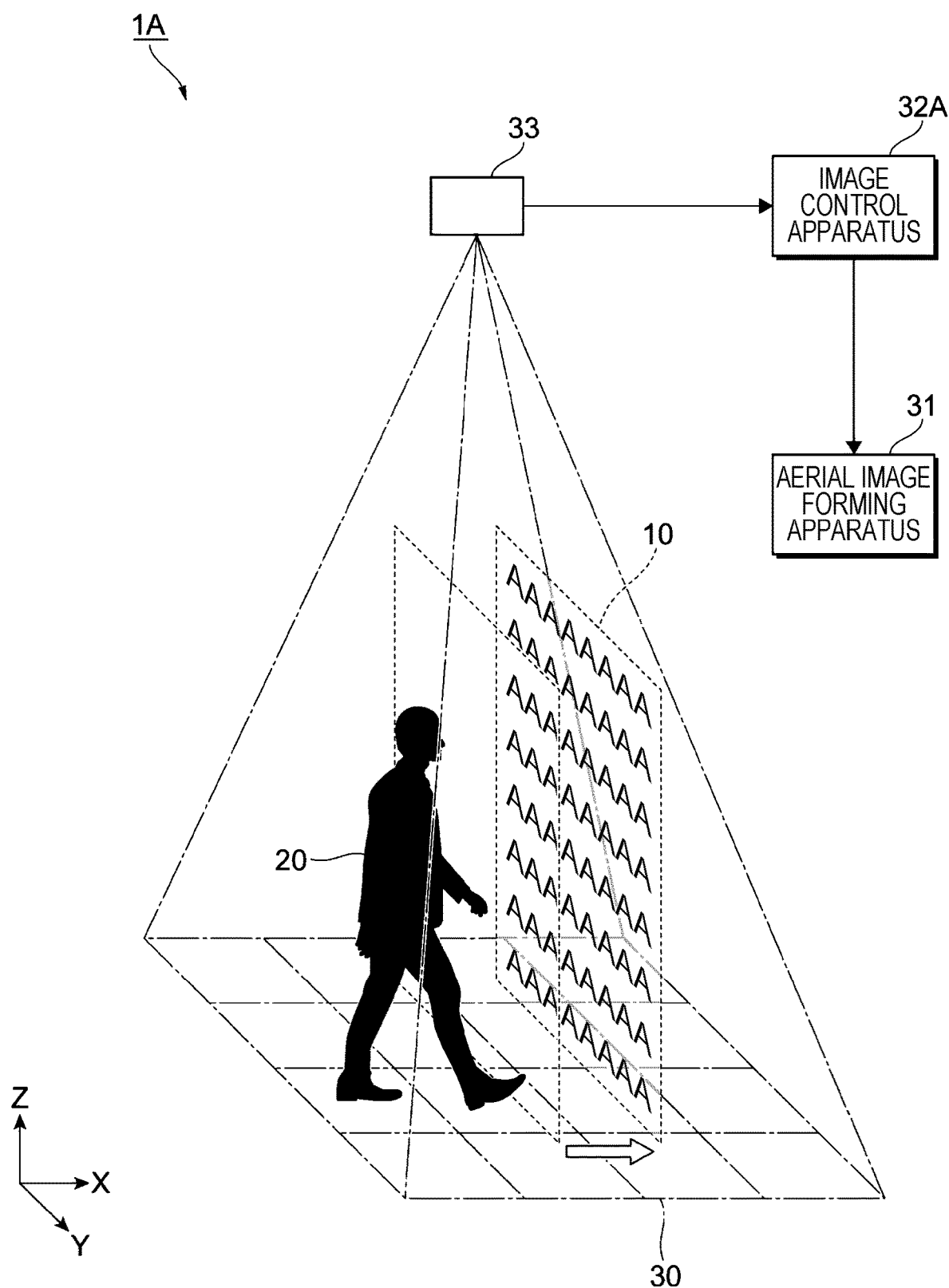
FIG. 11 illustrates Movement Example 1 of the aerial image.

FIG. 11 illustrates Movement Example 1 of the aerial image 10.

In FIG. 11, the aerial image 10 is moved in a direction in which the person 20 is oriented (that is, in an X-axis direction). Information on the orientation of the face of the person 20 is provided separately.

This movement is so-called translation and there is no change in the inclination of the display surface of the aerial image 10 (in a YZ plane).

Movement Example 2

Figure 12:
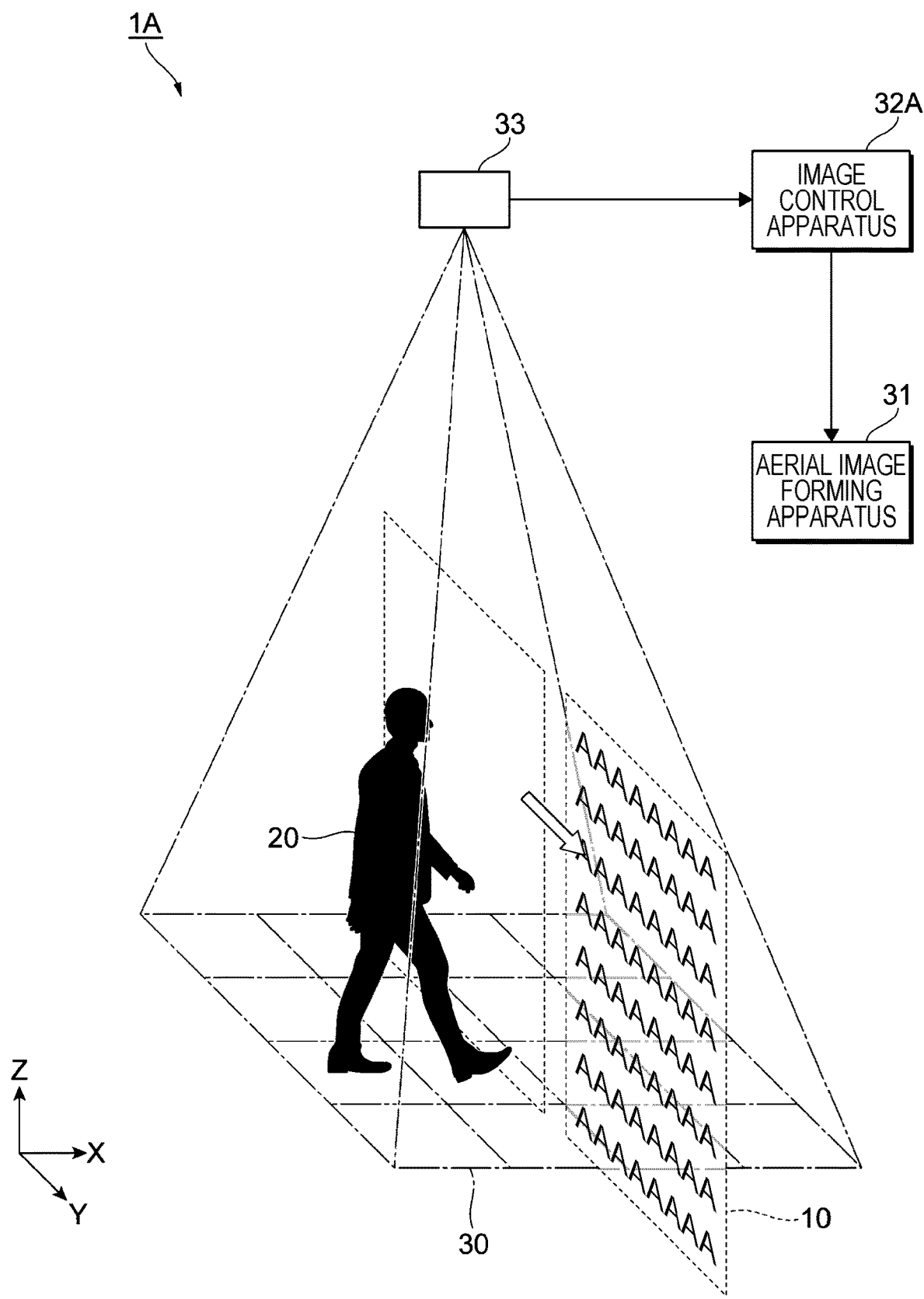
FIG. 12 illustrates Movement Example 2 of the aerial image.

FIG. 12 illustrates Movement Example 2 of the aerial image 10.

In FIG. 12, the aerial image 10 is moved in a rightward direction (that is, in a Y-axis direction) relative to the person 20.

This movement is so-called translation as well and there is no change in the inclination of the display surface of the aerial image 10 (in the YZ plane).

Movement Example 3

Figure 13:
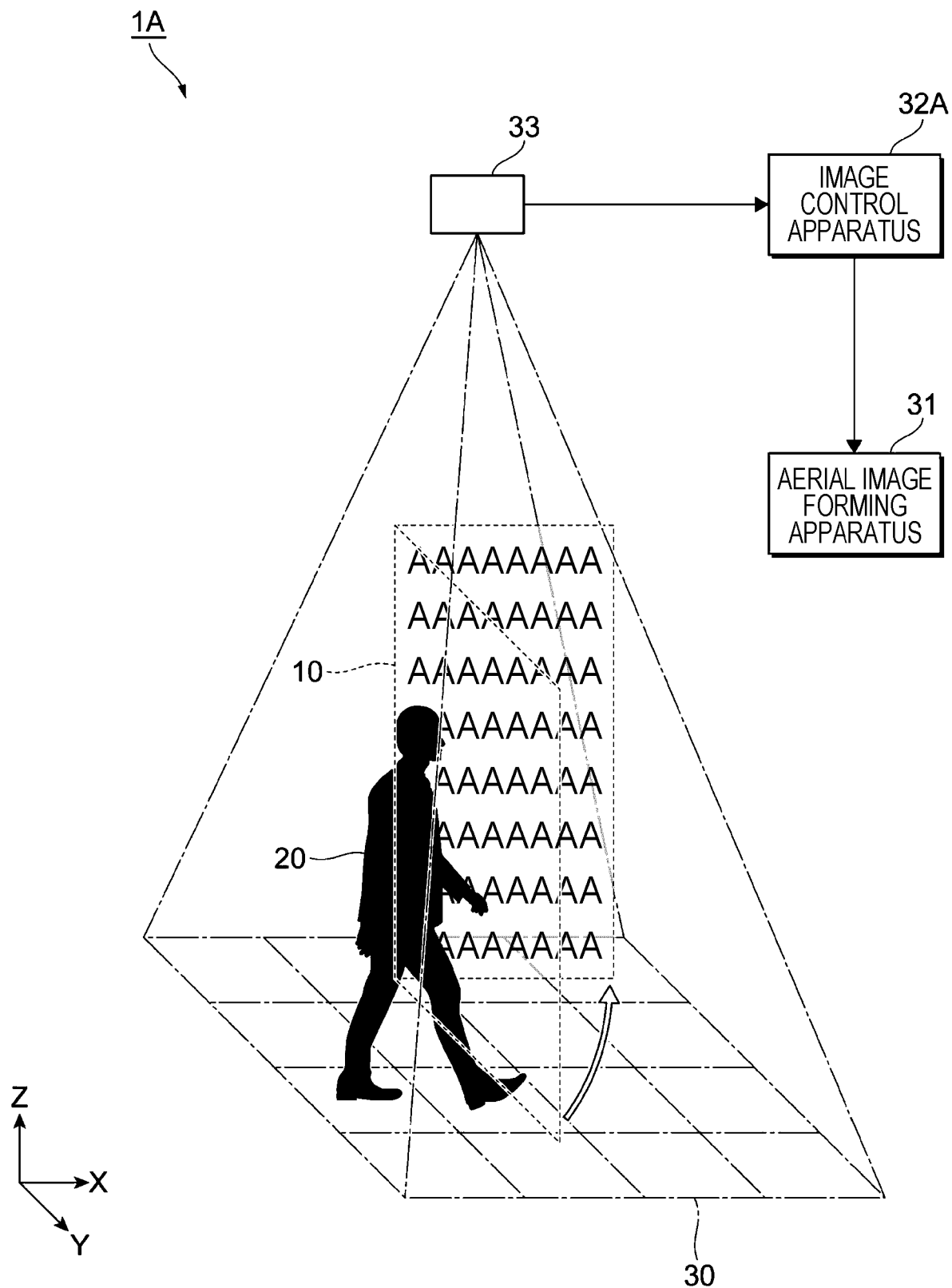
FIG. 13 illustrates Movement Example 3 of the aerial image.

FIG. 13 illustrates Movement Example 3 of the aerial image 10.

In FIG. 13, the aerial image 10 is moved counterclockwise about a rotation axis defined on the left side of the aerial image 10 (that is, about a Z-axis) as viewed from the person 20.

This movement is so-called rotation and there is no change in the inclination of the display surface of the aerial image 10 (in the YZ plane).

When the person 20 is moving, there is a high probability that the face of the person 20 is oriented in the moving direction. Therefore, the aerial image 10 may be moved in the detected moving direction.

There is a limit to the movable range of the aerial image 10. Thus, the aerial image 10 may be moved in a direction different from the moving direction of the person 20. Movement Example 2 (FIG. 12) and Movement Example 3 (FIG. 13) are examples of such a movement.

When the person 20 is moving, it is desirable to move the aerial image 10 so that an angle between the display surface of the aerial image 10 and the moving direction of the person 20 is smaller than a predetermined angle (ultimately, the display surface and the moving direction do not intersect each other). When the angle is small, the range in which the person 20 may recognize the display surface of the aerial image 10 may be extended.

The moving direction and the moving distance of the aerial image 10 may be determined by predicting the moving direction of the person 20 with reference to information on the structure (for example, passages or walls) of the space where the aerial image 10 is formed and information on a path.

Movement Example 4

Figure 14:
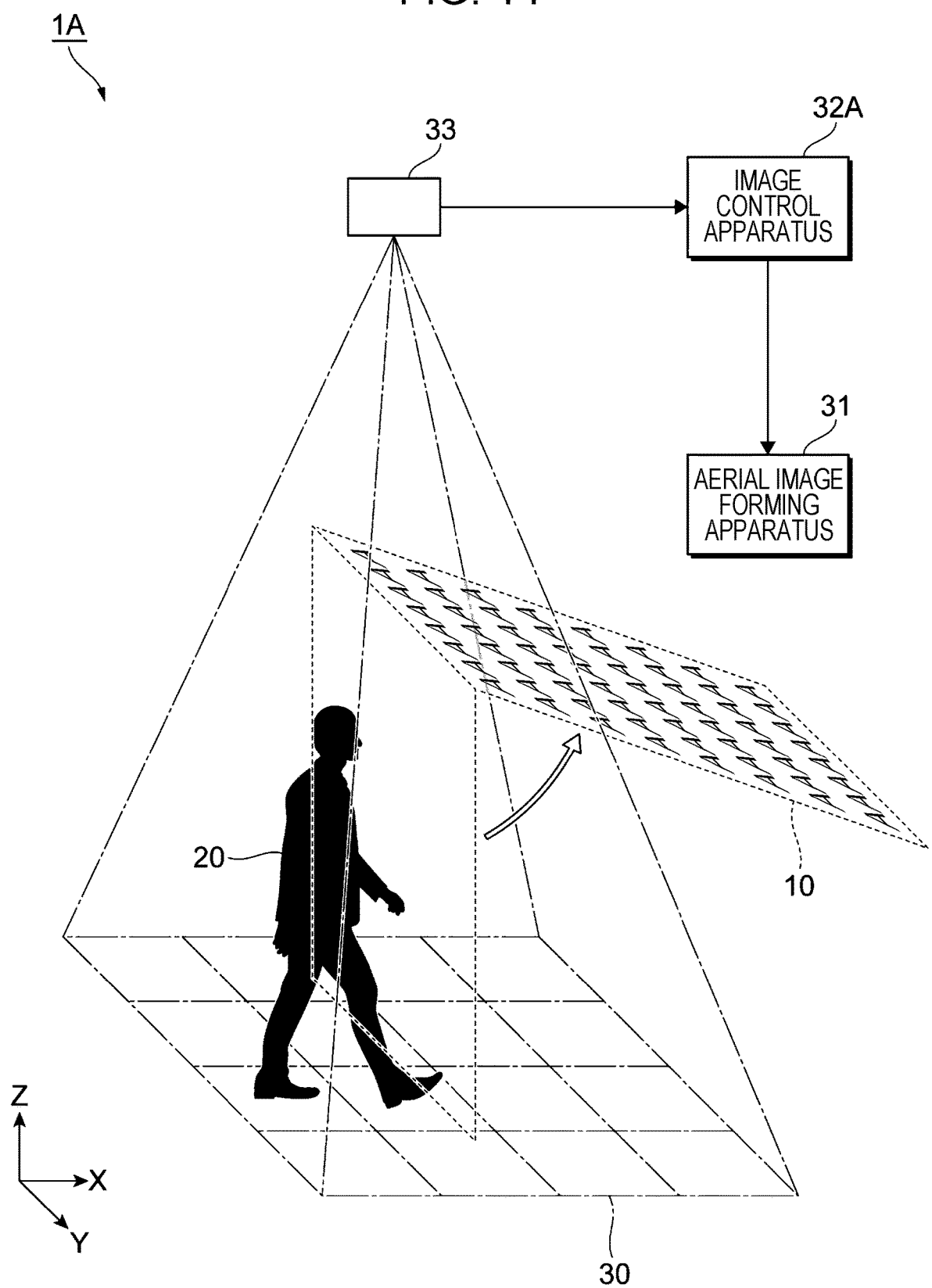
FIG. 14 illustrates Movement Example 4 of the aerial image.

FIG. 14 illustrates Movement Example 4 of the aerial image 10.

In FIG. 14, the aerial image 10 is moved counterclockwise about a rotation axis defined on the side of the aerial image 10 that is located on a ceiling side (that is, about the Y-axis).

This movement is an example of so-called rotation and the inclination of the display surface of the aerial image 10 is changed without changing the dimensions of the display surface.

Second Exemplary Embodiment

<Schematic Configuration of Aerial Image Forming System>

Figure 15:
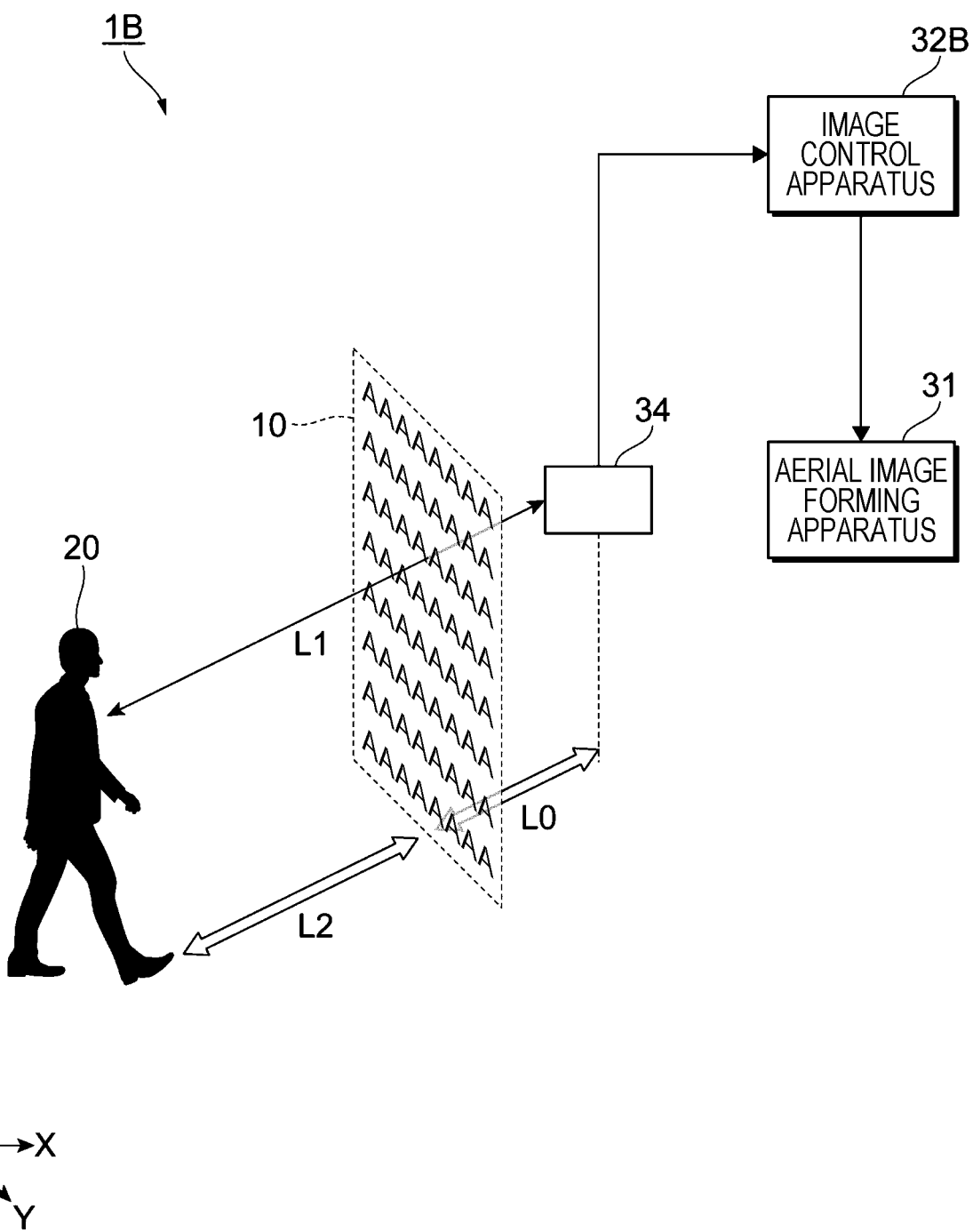
FIG. 15 illustrates the schematic configuration of an aerial image forming system according to a second exemplary embodiment.

FIG. 15 illustrates the schematic configuration of an aerial image forming system 1B according to a second exemplary embodiment. The aerial image forming system 1B is an example of the information processing system.

In FIG. 15, parts corresponding to those in FIG. 1 are denoted by the same reference symbols.

The aerial image forming system 1B according to this exemplary embodiment is different from the aerial image forming system 1A according to the first exemplary embodiment (see FIG. 1) in that a distance sensor 34 is used in place of the person detecting sensor 33.

Information on a distance measured by the distance sensor 34 is used and therefore an image control apparatus 32B is used for controlling the aerial image forming apparatus 31 in the aerial image forming system 1B. The image control apparatus 32B is an example of the controller and is also an example of the information processing apparatus.

In the case of this exemplary embodiment, the distance sensor 34 is arranged behind the aerial image 10 and measures a distance L1 to the person 20 who approaches the aerial image 10.

A distance L0 from the distance sensor 34 to the aerial image 10 is a known distance. Examples of the distance L0 to be used herein include a distance to a position to be used as a reference for the formation of the aerial image 10 (so-called initial position or reference position) and a distance to a position determined when the position where the aerial image 10 is formed has been adjusted.

Any type of measurement may be used as the measurement of a distance by the distance sensor 34.

Examples of the distance sensor 34 to be used herein include an optical sensor that measures a distance through light reflection on an object, an ultrasonic sensor that uses an ultrasonic wave of 20 kHz or higher, a sensor that determines a distance by using parallax between two images that are captured stereoscopically by using two image capturing cameras, and a sensor that detects a distance by capturing an image with blurring and color misregistration caused in accordance with the distance by using a single image capturing camera and performing image processing on the blurring and color misregistration.

There may be employed a mechanism that identifies a distance by using information obtained through detection performed by one or plural person detecting sensors 33 (see FIG. 1) whose positions are known in a space.

<Configuration of Image Control Apparatus 32B>

Figure 16:
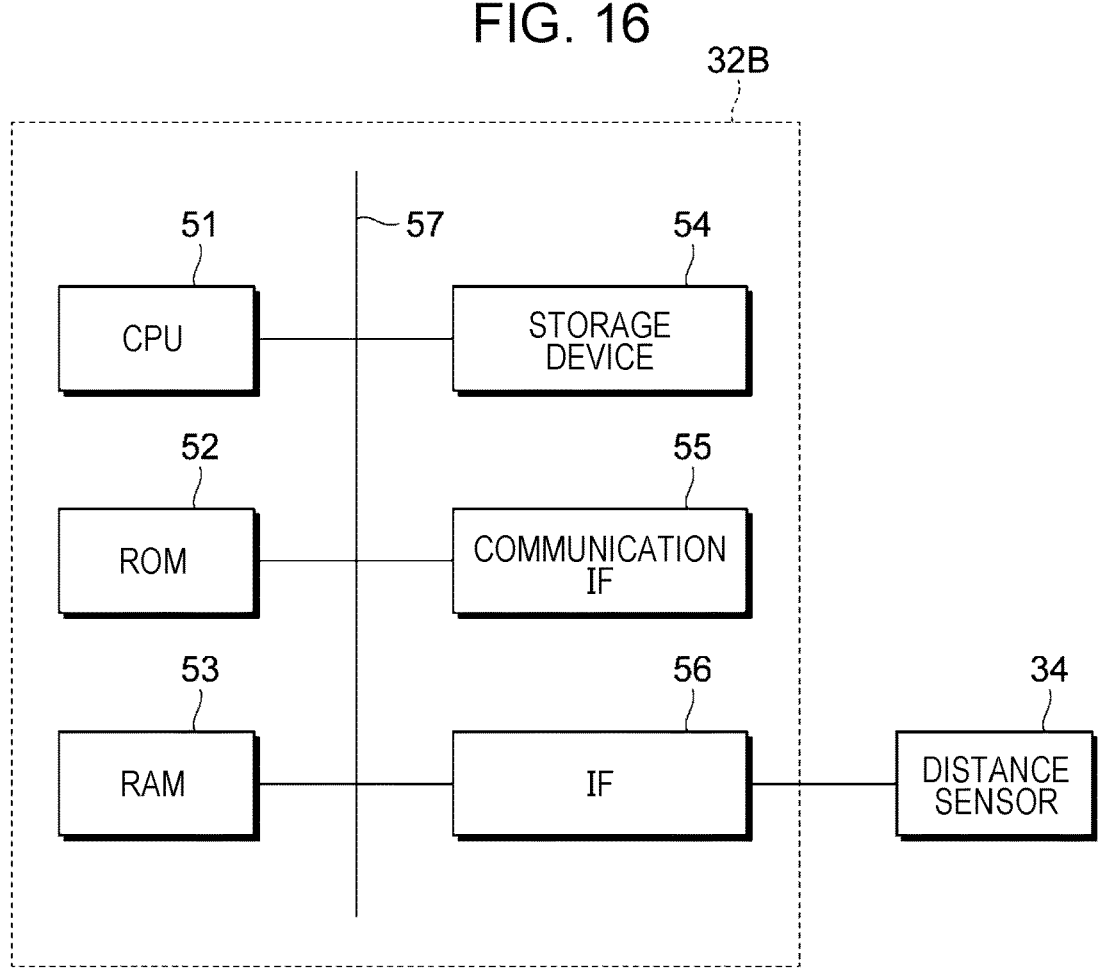
FIG. 16 illustrates an example of the hardware configuration of an image control apparatus according to the second exemplary embodiment.

FIG. 16 illustrates an example of the hardware configuration of the image control apparatus 32B according to the second exemplary embodiment.

In FIG. 16, parts corresponding to those in FIG. 7 are denoted by the same reference symbols.

The hardware configuration of the image control apparatus 32B is basically similar to that of the image control apparatus 32A (FIG. 7).

Figure 17:
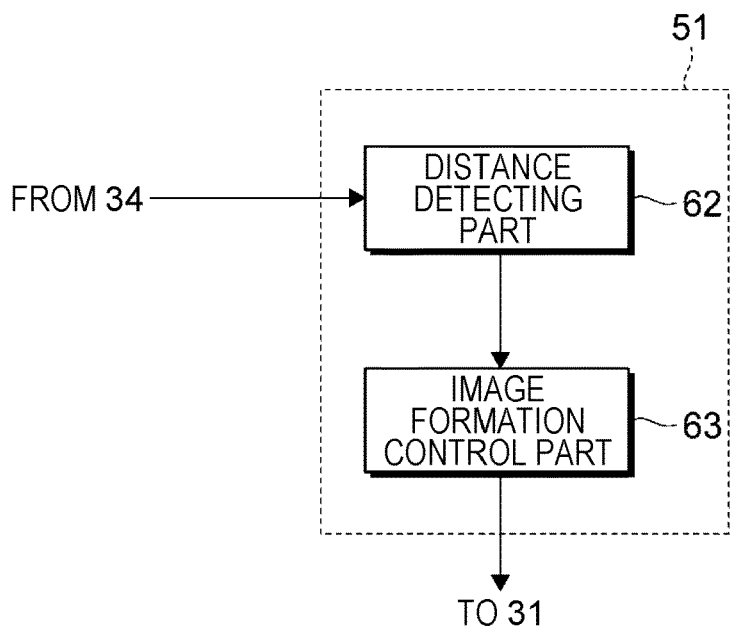
FIG. 17 illustrates an example of the functional configuration of the image control apparatus according to the second exemplary embodiment.

FIG. 17 illustrates an example of the functional configuration of the image control apparatus 32B (see FIG. 16) according to the second exemplary embodiment.

The functional configuration illustrated in FIG. 17 is implemented through execution of a program by the CPU 51 (see FIG. 16).

The CPU 51 functions as a distance detecting part 62 that detects the distance L1 to the person 20 (see FIG. 15) in the space where the aerial image 10 (see FIG. 15) is formed, and an image formation control part 63 that calculates a distance L2 between the aerial image 10 and the person 20 by using the detected distance L1 to the person 20 and controls the formation of the aerial image 10 based on the calculated distance L2.

The image formation control part 63 calculates the distance L2 from the aerial image 10 to the person 20 based on information on a direction in which the distance L1 is measured and information on the distance L0. When the aerial image 10 is rendered as a two-dimensional plane, the distance L2 is calculated as, for example, a distance to the display surface. When the aerial image 10 is a three-dimensional image, the distance L2 is calculated as, for example, a distance to a surface closest to the person 20. In any case, the distance need not be measured precisely.

<Processing Operation of Image Formation Control Part>

Figure 18:
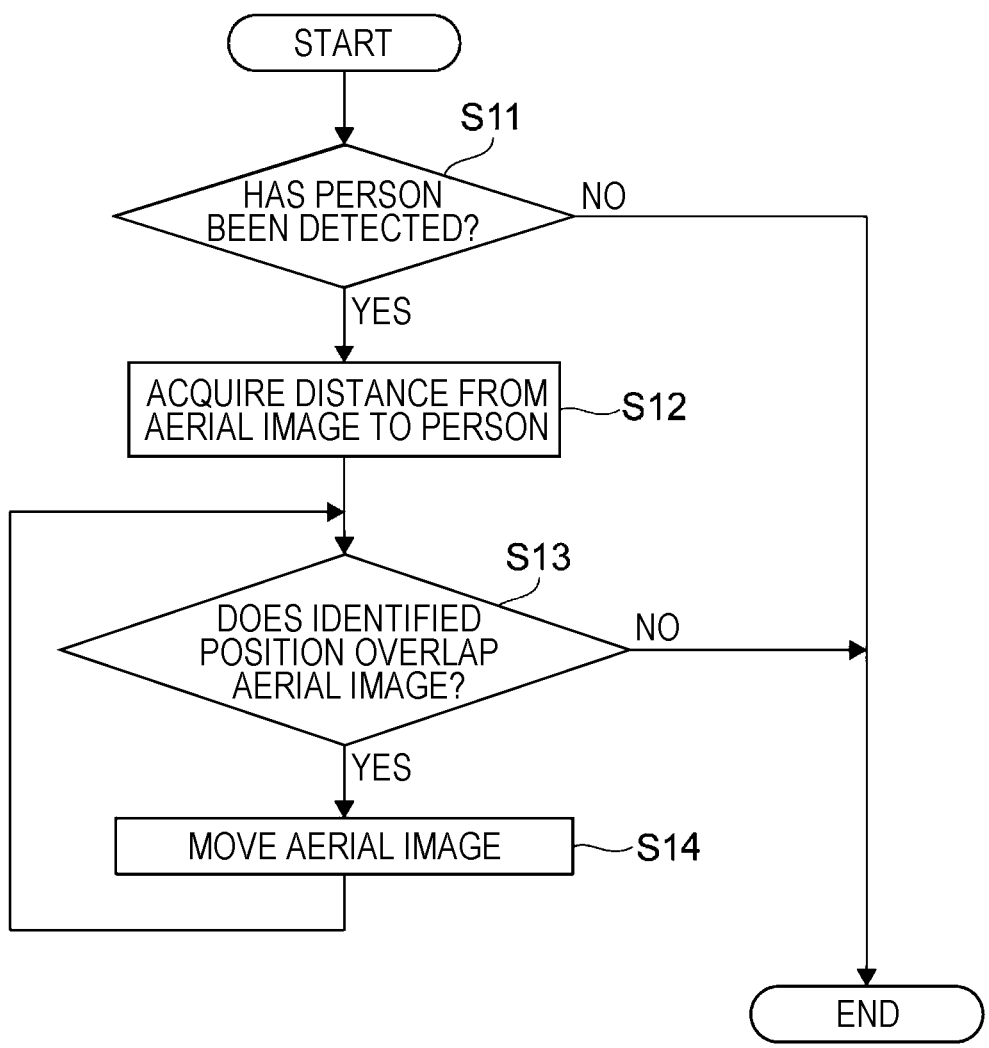
FIG. 18 is a flowchart for describing an overview of a processing operation to be executed by an image formation control part.

FIG. 18 is a flowchart for describing an overview of a processing operation to be executed by the image formation control part 63 (see FIG. 17). Because of the overview, details differ depending on individual styles of use.

First, the image formation control part 63 determines whether a person has been detected (Step S11).

When the result of Step S11 is NO, the image formation control part 63 terminates the processing. The image formation control part 63 may repeat the determination of Step S11 until a person is detected.

When the result of Step S11 is YES, the image formation control part 63 acquires a distance from an aerial image to the person (that is, the distance L2) (Step S12). The image formation control part 63 may acquire information on the position and the moving direction of the person relative to the aerial image based on, for example, information on a direction in which the distance sensor 34 (see FIG. 15) has detected the person and information on a change in the distance.

Next, the image formation control part 63 determines whether the identified position overlaps the aerial image by using information on the acquired distance (Step S13).

Similarly to the case of the first exemplary embodiment, the determination does not require precise detection of an overlap. For example, the determination may be made in consideration of a margin.

When the result of Step S13 is NO, the image formation control part 63 terminates the processing. The reason is that there is no need to move the position where the aerial image is formed.

When the result of Step S13 is YES, the image formation control part 63 moves the aerial image in a direction in which the aerial image does not overlap the person (Step S14).

The movement of the aerial image is similar to that of the first exemplary embodiment and therefore description thereof is omitted. That is, as described with reference to FIG. 10 to FIG. 14, the aerial image is moved or rotated in one direction without changing the dimensions of the displayed aerial image.

Third Exemplary Embodiment

<Schematic Configuration of Aerial Image Forming System>

Figure 19:
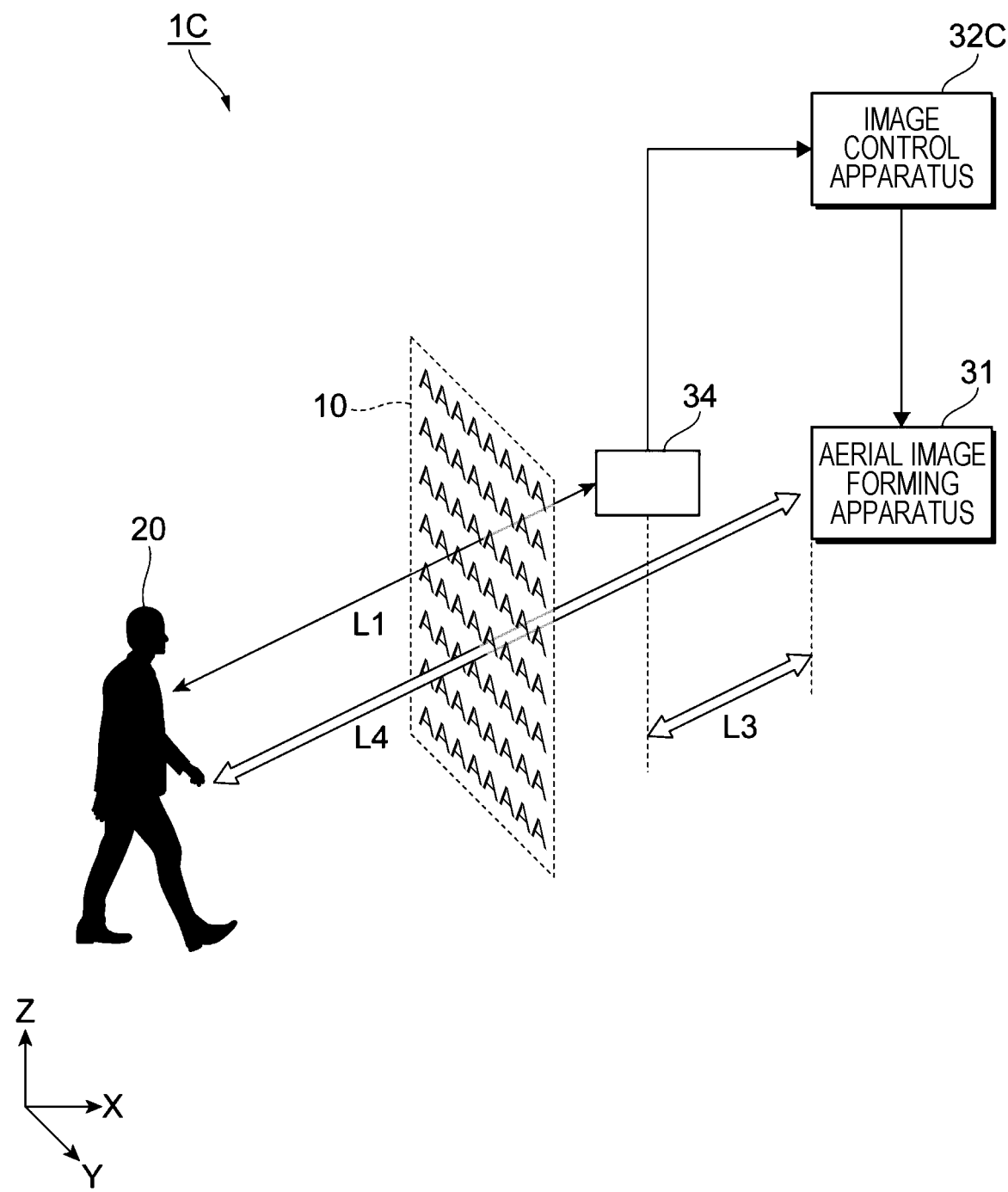
FIG. 19 illustrates the schematic configuration of an aerial image forming system according to a third exemplary embodiment.

FIG. 19 illustrates the schematic configuration of an aerial image forming system 1C according to a third exemplary embodiment. The aerial image forming system 1C is an example of the information processing system.

In FIG. 19, parts corresponding to those in FIG. 1 are denoted by the same reference symbols.

In this exemplary embodiment, the movement of the aerial image 10 is controlled based on a distance L4 between the aerial image forming apparatus 31 and the person 20.

For example, the distance L4 is defined as a value obtained by adding a distance L3 between the aerial image forming apparatus 31 and the distance sensor 34 to the distance L1 between the distance sensor 34 and the person 20. When the distance sensor 34 is integrated with the aerial image forming apparatus 31, the distance L1 is equal to the distance L4.

As described in the second exemplary embodiment, the distance L1 has a relationship in which the distance L2 between the aerial image 10 and the person 20 is added to the distance L0 between the distance sensor 34 and the aerial image 10. That is, the control that uses the distance L4 is equivalent to the control that uses a value obtained by adding the distance L2 and the distance L3 to the distance L0.

Thus, the control that uses the distance L4 is also a modified example of the second exemplary embodiment in that the distance L2 between the aerial image 10 and the person 20 is used.

The distance L3 that is used in this exemplary embodiment is the distance between the aerial image forming apparatus 31 and the distance sensor 34 that are present in the space in reality. Therefore, the distance L3 may be measured directly or set by using a value.

For example, when the aerial image forming apparatus 31 is moved by using a mechanism (not illustrated), the distance L3 may be updated by using a control value for the movement.

The functional configuration of an image control apparatus 32C of this exemplary embodiment is identical to the functional configuration of the image control apparatus 32B (see FIG. 16) described with reference to FIG. 17. That is, the image control apparatus 32C functions as the distance detecting part 62 and the image formation control part 63.

<Processing Operation of Image Formation Control Part>

Figure 20:
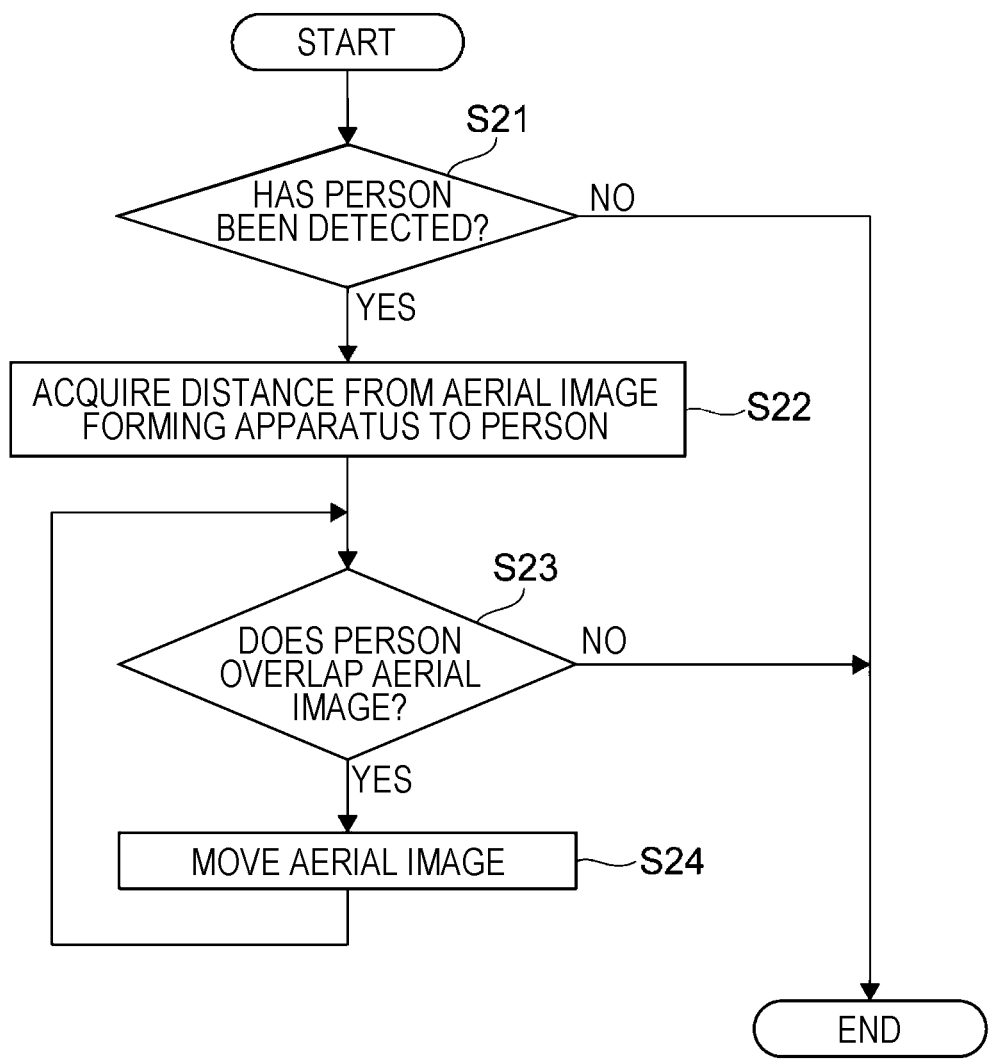
FIG. 20 is a flowchart for describing an overview of another processing operation to be executed by an image formation control part.

FIG. 20 is a flowchart for describing an overview of another processing operation to be executed by the image formation control part 63 (see FIG. 17). Because of the overview, details differ depending on individual styles of use.

First, the image formation control part 63 determines whether a person has been detected (Step S21).

When the result of Step S21 is NO, the image formation control part 63 terminates the processing. The image formation control part 63 may repeat the determination of Step S21 until a person is detected.

When the result of Step S21 is YES, the image formation control part 63 acquires a distance from the aerial image forming apparatus to the person (that is, the distance L4) (Step S22). The image formation control part 63 may acquire information on the position and the moving direction of the person relative to the aerial image forming apparatus based on, for example, information on a direction in which the distance sensor 34 (see FIG. 19) has detected the person and information on a change in the distance.

Next, the image formation control part 63 determines whether the person overlaps an aerial image by using information on the acquired distance (Step S23).

Similarly to the cases of the first exemplary embodiment and the second exemplary embodiment, the determination does not require precise detection of an overlap. For example, the determination may be made in consideration of a margin.

When the result of Step S23 is NO, the image formation control part 63 terminates the processing. The reason is that there is no need to move the position where the aerial image is formed.

When the result of Step S23 is YES, the image formation control part 63 moves the aerial image in a direction in which the aerial image does not overlap the person (Step S24).

The movement of the aerial image is similar to those of the first exemplary embodiment and the second exemplary embodiment and therefore description thereof is omitted. That is, as described with reference to FIG. 10 to FIG. 14, the aerial image is moved or rotated in one direction without changing the dimensions of the displayed aerial image.

Fourth Exemplary Embodiment

<Schematic Configuration of Aerial Image Forming System>

Figure 21:
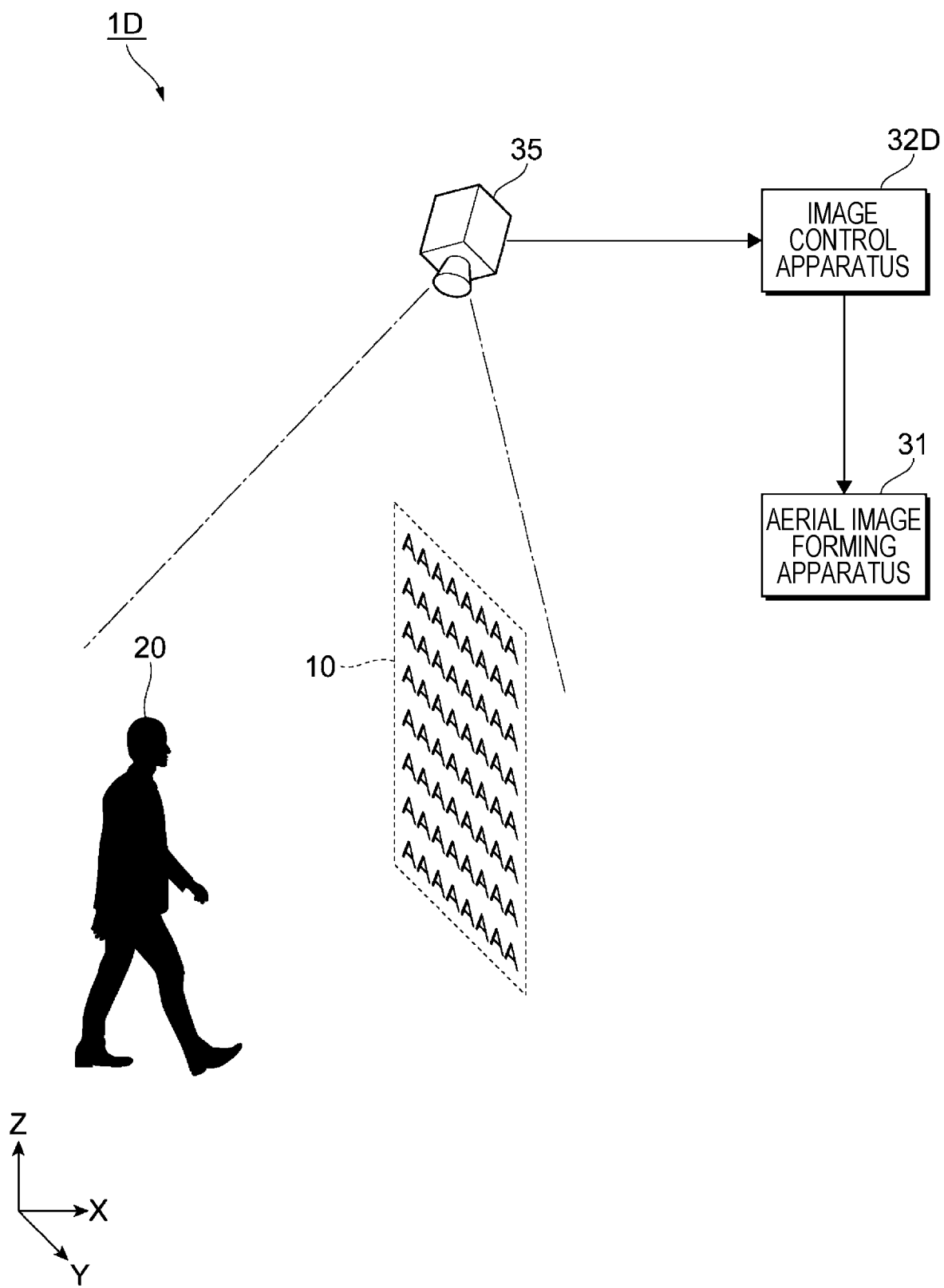
FIG. 21 illustrates the schematic configuration of an aerial image forming system according to a fourth exemplary embodiment.

FIG. 21 illustrates the schematic configuration of an aerial image forming system 1D according to a fourth exemplary embodiment. The aerial image forming system 1D is an example of the information processing system.

In FIG. 21, parts corresponding to those in FIG. 1 are denoted by the same reference symbols.

The aerial image forming system 1D of this exemplary embodiment includes the aerial image forming apparatus 31 that forms the aerial image 10 in the air, an image capturing camera 35 that captures an image of a space including the aerial image 10, and an image control apparatus 32D that controls the formation of the aerial image 10 by processing the captured image.

The image control apparatus 32D is an example of the controller and is also an example of the information processing apparatus.

In the example of FIG. 21, one image capturing camera 35 is provided but plural image capturing cameras 35 may be provided instead. When plural image capturing cameras 35 are used, it is desirable that the image of the space where the aerial image 10 is formed be captured in different directions. When the image is captured in plural directions, the number of blind spots is reduced, thereby reducing omission of detection of an overlap between the aerial image 10 and the person 20.

Figure 22:
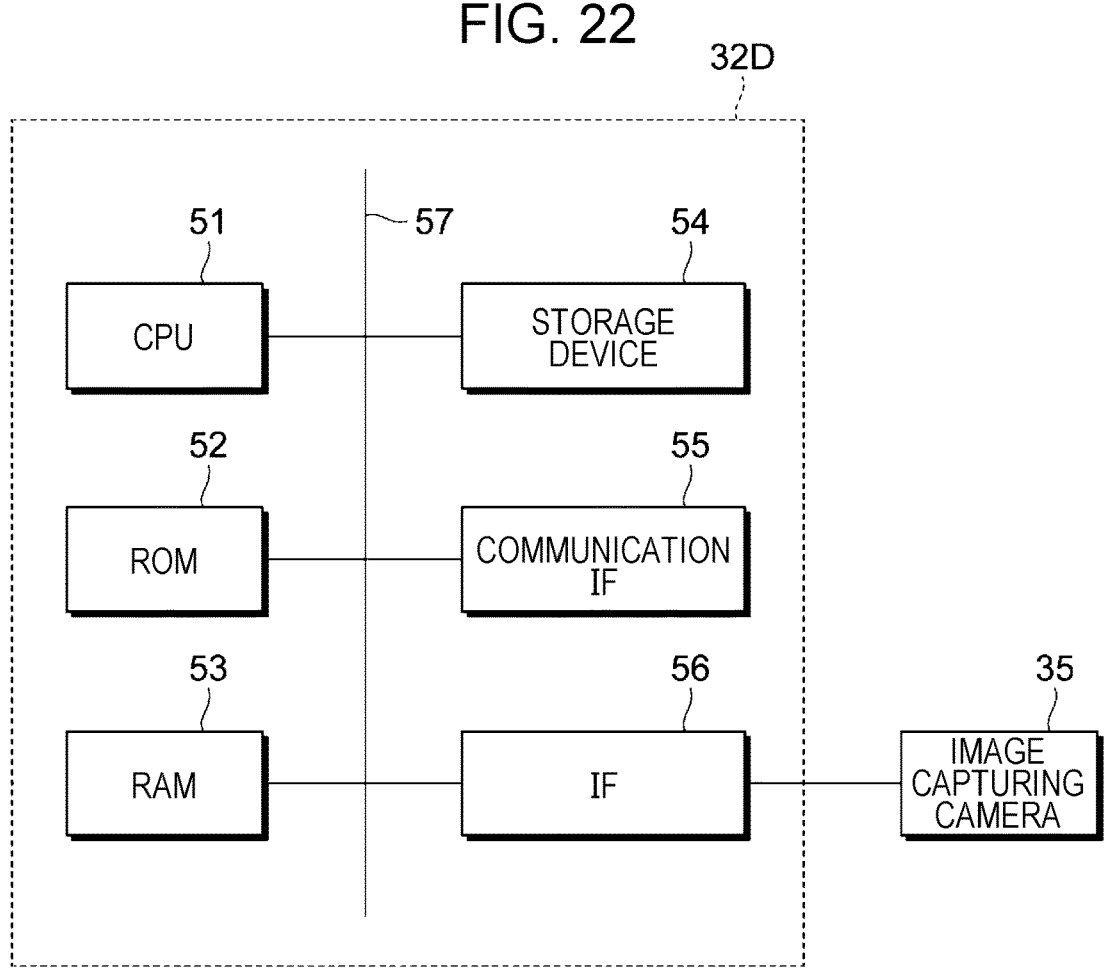
FIG. 22 illustrates an example of the hardware configuration of an image control apparatus according to the fourth exemplary embodiment.

FIG. 22 illustrates an example of the hardware configuration of the image control apparatus 32D according to the fourth exemplary embodiment.

In FIG. 22, parts corresponding to those in FIG. 7 are denoted by the same reference symbols.

The hardware configuration of the image control apparatus 32D is basically similar to that of the image control apparatus 32A (FIG. 7).

Figure 23:
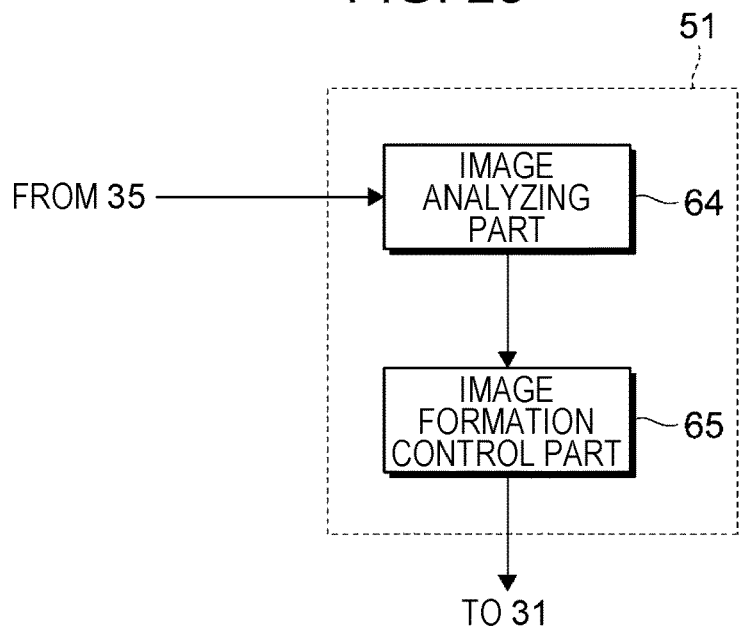
FIG. 23 illustrates an example of the functional configuration of the image control apparatus according to the fourth exemplary embodiment.

FIG. 23 illustrates an example of the functional configuration of the image control apparatus 32D (see FIG. 21) according to the fourth exemplary embodiment.

The functional configuration illustrated in FIG. 23 is implemented through execution of a program by the CPU 51 (see FIG. 22).

The CPU 51 functions as an image analyzing part 64 that analyzes a captured image of the space including the aerial image 10 (see FIG. 21), and an image formation control part 65 that controls the formation of the aerial image 10 (see FIG. 21) by using an analysis result.

The image analyzing part 64 recognizes an overlap between the aerial image 10 and the person 20 through the image analysis. For example, the image analyzing part 64 may detect a gap between the aerial image 10 and the person 20 and determine that the aerial image 10 and the person 20 overlap each other when the gap is not detected. The image analyzing part 64 may determine that the aerial image 10 and the person 20 overlap each other when there is a high degree of match between the captured image and an image that shows an overlap. The overlap may be detected by using so-called artificial intelligence.

The image formation control part 65 instructs, by using a result of the analysis of the captured image, the aerial image forming apparatus 31 to, for example, move the position where the aerial image 10 is formed or reduce the dimensions of the aerial image 10 so that the aerial image 10 and the person 20 do not overlap each other.

<Processing Operation of Image Formation Control Part>

Figure 24:
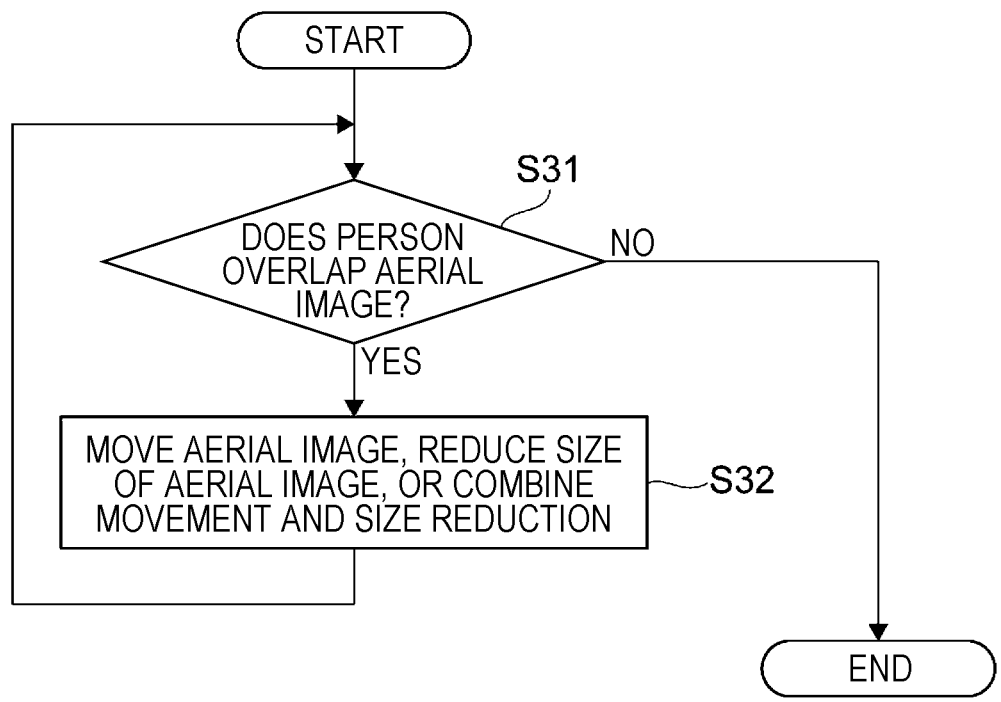
FIG. 24 is a flowchart for describing an overview of a processing operation to be executed by an image formation control part.

FIG. 24 is a flowchart for describing an overview of a processing operation to be executed by the image formation control part 65 (see FIG. 23). Because of the overview, details differ depending on individual styles of use.

First, the image formation control part 65 determines whether a person overlaps an aerial image (Step S31).

When the result of Step S31 is NO, the image formation control part 65 terminates the processing.

When the result of Step S31 is YES, the image formation control part 65 moves the aerial image, reduces the size of the aerial image, or combines the movement and the size reduction (Step S32). This operation is repeated until the result of Step S31 becomes NO.

The movement of the aerial image is similar to that of the first exemplary embodiment and therefore description thereof is omitted. That is, as described with reference to FIG. 10 to FIG. 14, the aerial image is moved or rotated in one direction without changing the dimensions of the displayed aerial image.

Figure 25:
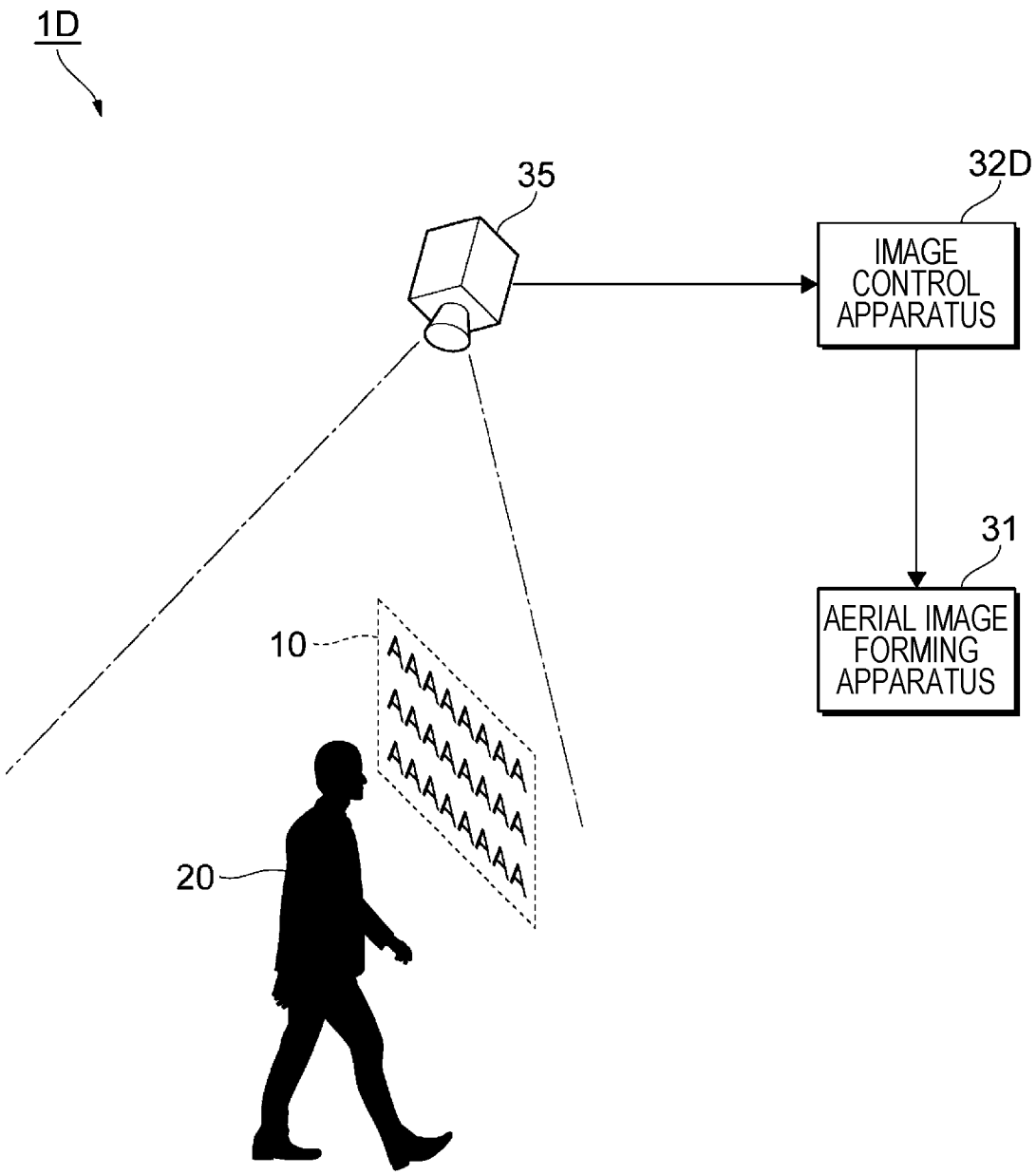
FIG. 25 illustrates an example in which the dimensions of an aerial image are reduced.

FIG. 25 illustrates an example in which the dimensions of the aerial image 10 are reduced. It is understood that the dimensions of the aerial image 10 illustrated in FIG. 25 are smaller than those of the aerial image 10 illustrated in FIG. 21. If the reduced dimensions are excessively small, the visibility may decrease in turn. Therefore, it is desirable that a limit be provided so that the reduced dimensions are not smaller than predetermined dimensions.

Fifth Exemplary Embodiment

<Schematic Configuration of Aerial Image Forming System>

Figure 26:
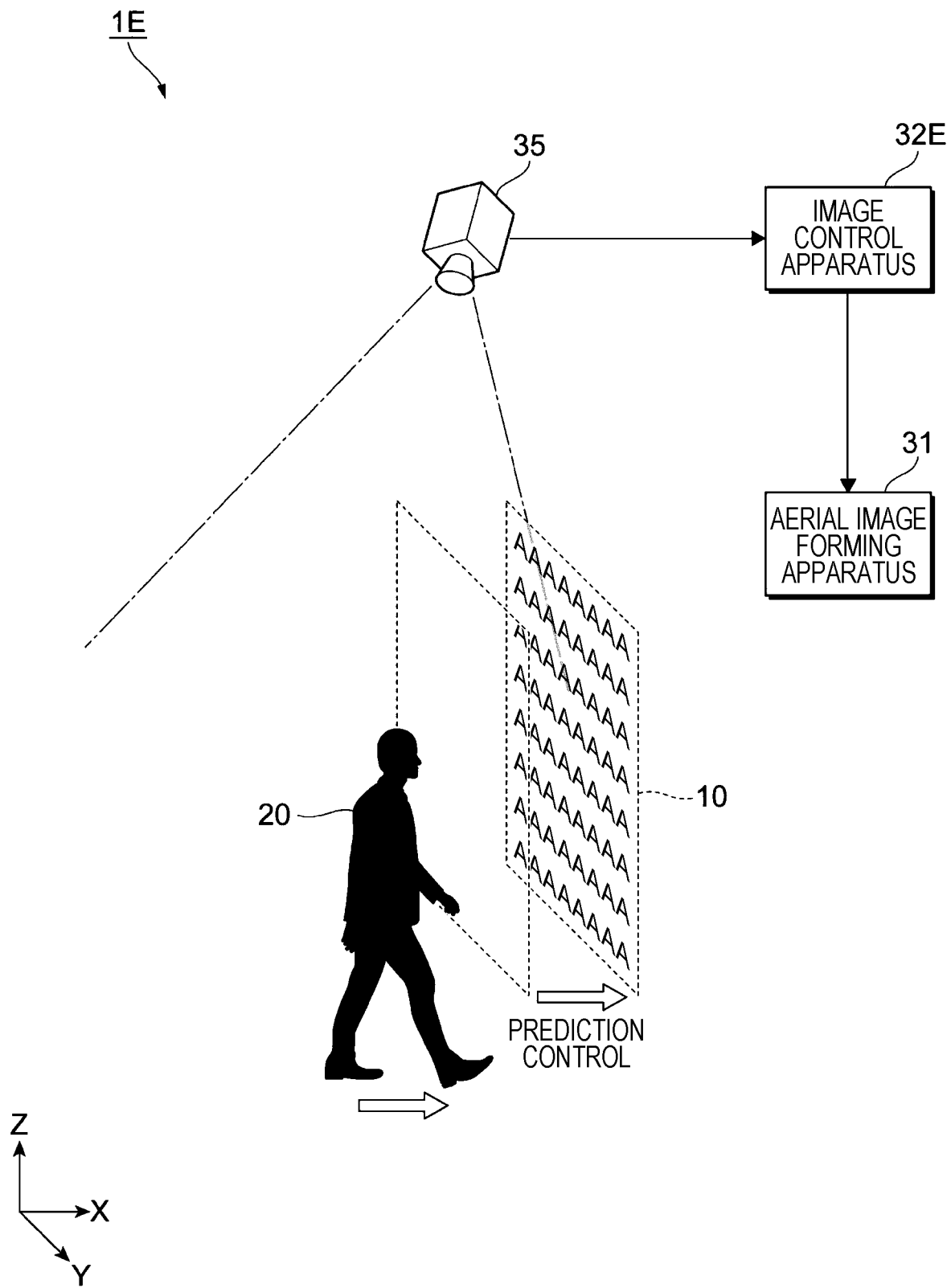
FIG. 26 illustrates the schematic configuration of an aerial image forming system according to a fifth exemplary embodiment.

FIG. 26 illustrates the schematic configuration of an aerial image forming system 1E according to a fifth exemplary embodiment. The aerial image forming system 1E is an example of the information processing system.

In FIG. 26, parts corresponding to those in FIG. 21 are denoted by the same reference symbols.

This exemplary embodiment is a modified example of the fourth exemplary embodiment.

This exemplary embodiment is different from the fourth exemplary embodiment in that approach of the person 20 to the aerial image 10 is predicted through image processing and the formation of the aerial image 10 is controlled before an overlap occurs.

Therefore, both the hardware configuration and the functional configuration of an image control apparatus 32E are similar to those of the fourth exemplary embodiment. That is, the image control apparatus 32E functions as the image analyzing part 64 (see FIG. 23) and the image formation control part 65 (see FIG. 23) through execution of a program.

The image control apparatus 32E is an example of the controller and is also an example of the information processing apparatus.

Figure 27:
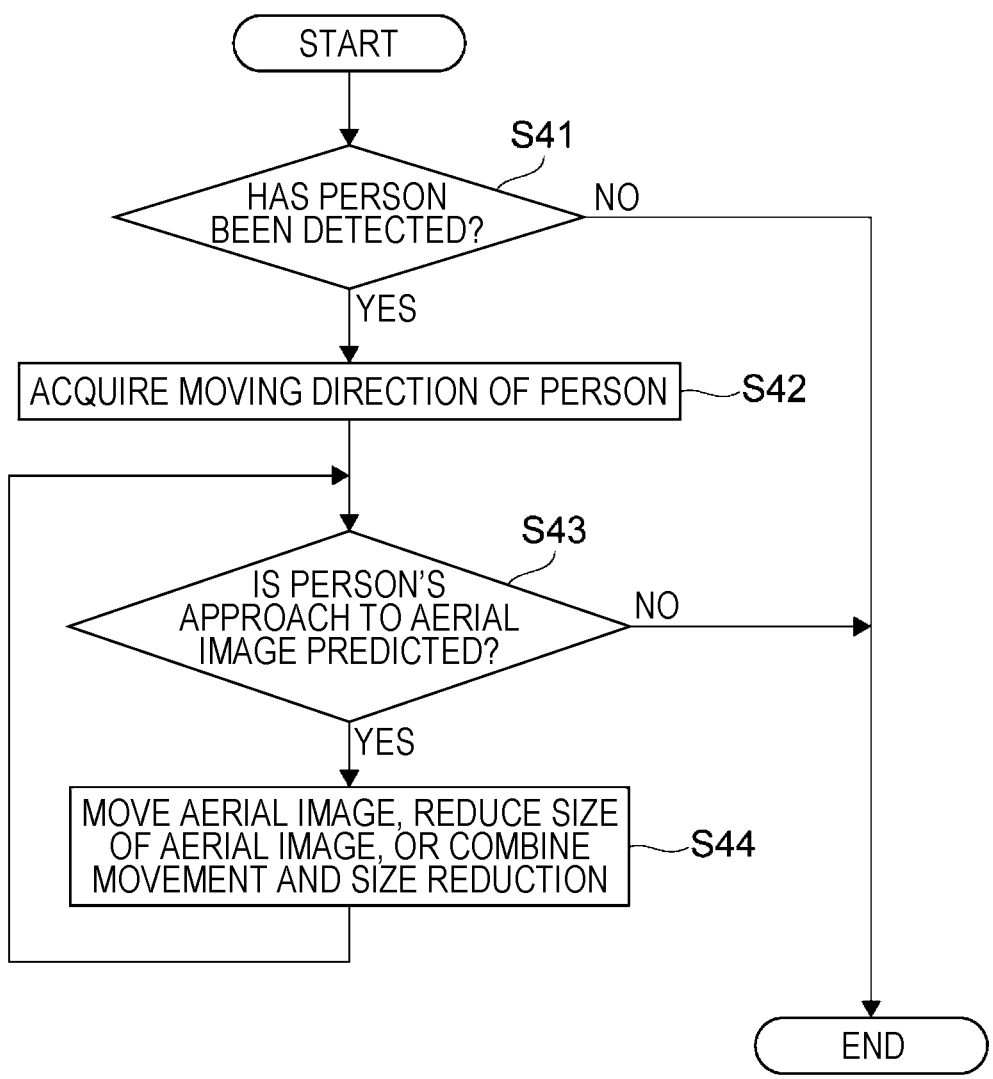
FIG. 27 is a flowchart for describing an overview of a processing operation to be executed by an image formation control part.

FIG. 27 is a flowchart for describing an overview of a processing operation to be executed by the image formation control part 65 (see FIG. 23). Because of the overview, details differ depending on individual styles of use.

First, the image formation control part 65 determines whether a person has been detected (Step S41). This determination is also implemented through the analysis of a captured image. The number of detected persons may be zero, one, or plural.

When the result of Step S41 is NO, the image formation control part 65 terminates the processing. The image formation control part 65 may repeat the determination of Step S41 until a person is detected.

When the result of Step S41 is YES, the image formation control part 65 acquires a moving direction of the detected person through the analysis of the captured image (Step S42).

Next, the image formation control part 65 determines whether approach of the person to an aerial image in the acquired moving direction is predicted (Step S43). The approach includes a case in which the aerial image is located in the moving direction as well as the case in which the aerial image and the person actually overlap each other.

It is desirable that the prediction be limited within a predetermined time from the time of determination. For example, the prediction is limited within 3 seconds. This is because the moving direction of the person may change with time.

When the result of Step S43 is NO, the image formation control part 65 terminates the processing.

When the result of Step S43 is YES, the image formation control part 65 moves the aerial image, reduces the size of the aerial image, or combines the movement and the size reduction (Step S44). This operation is repeated until the result of Step S43 becomes NO.

The movement of the aerial image is similar to that of the fourth exemplary embodiment and therefore description thereof is omitted.

Sixth Exemplary Embodiment

<Schematic Configuration of Aerial Image Forming System>

Figure 28:
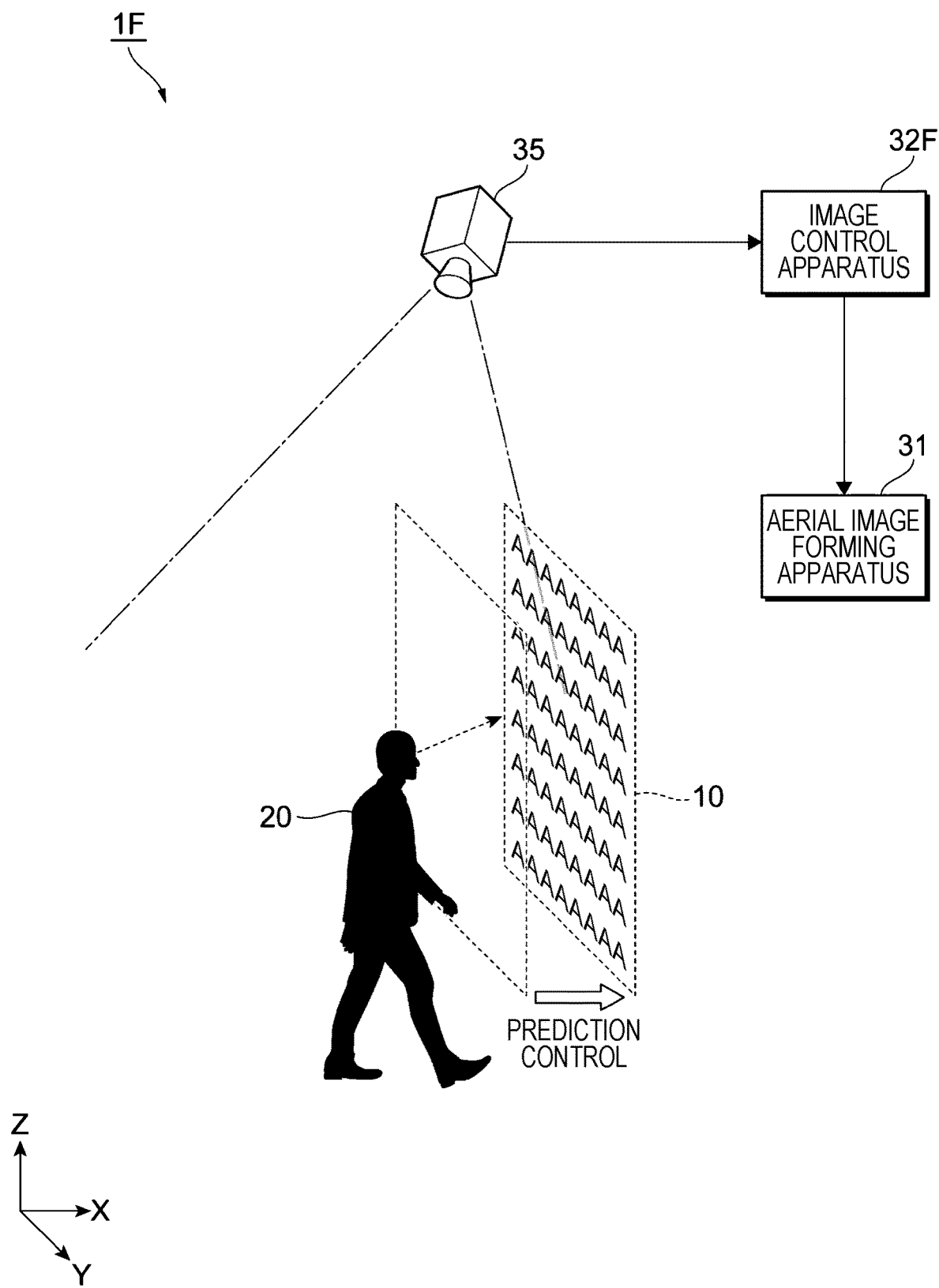
FIG. 28 illustrates the schematic configuration of an aerial image forming system according to a sixth exemplary embodiment.

FIG. 28 illustrates the schematic configuration of an aerial image forming system 1F according to a sixth exemplary embodiment. The aerial image forming system 1F is an example of the information processing system.

In FIG. 28, parts corresponding to those in FIG. 21 are denoted by the same reference symbols.

This exemplary embodiment is a further modified example of the fourth exemplary embodiment.

This exemplary embodiment is different from the fourth exemplary embodiment in that a direction of the line of sight of the person 20 is identified through image processing and the formation of the aerial image 10 is controlled before an overlap occurs.

Therefore, both the hardware configuration and the functional configuration of an image control apparatus 32F are similar to those of the fourth exemplary embodiment. That is, the image control apparatus 32F functions as the image analyzing part 64 (see FIG. 23) and the image formation control part 65 (see FIG. 23) through execution of a program.

The image control apparatus 32F is an example of the controller and is also an example of the information processing apparatus.

Figure 29:
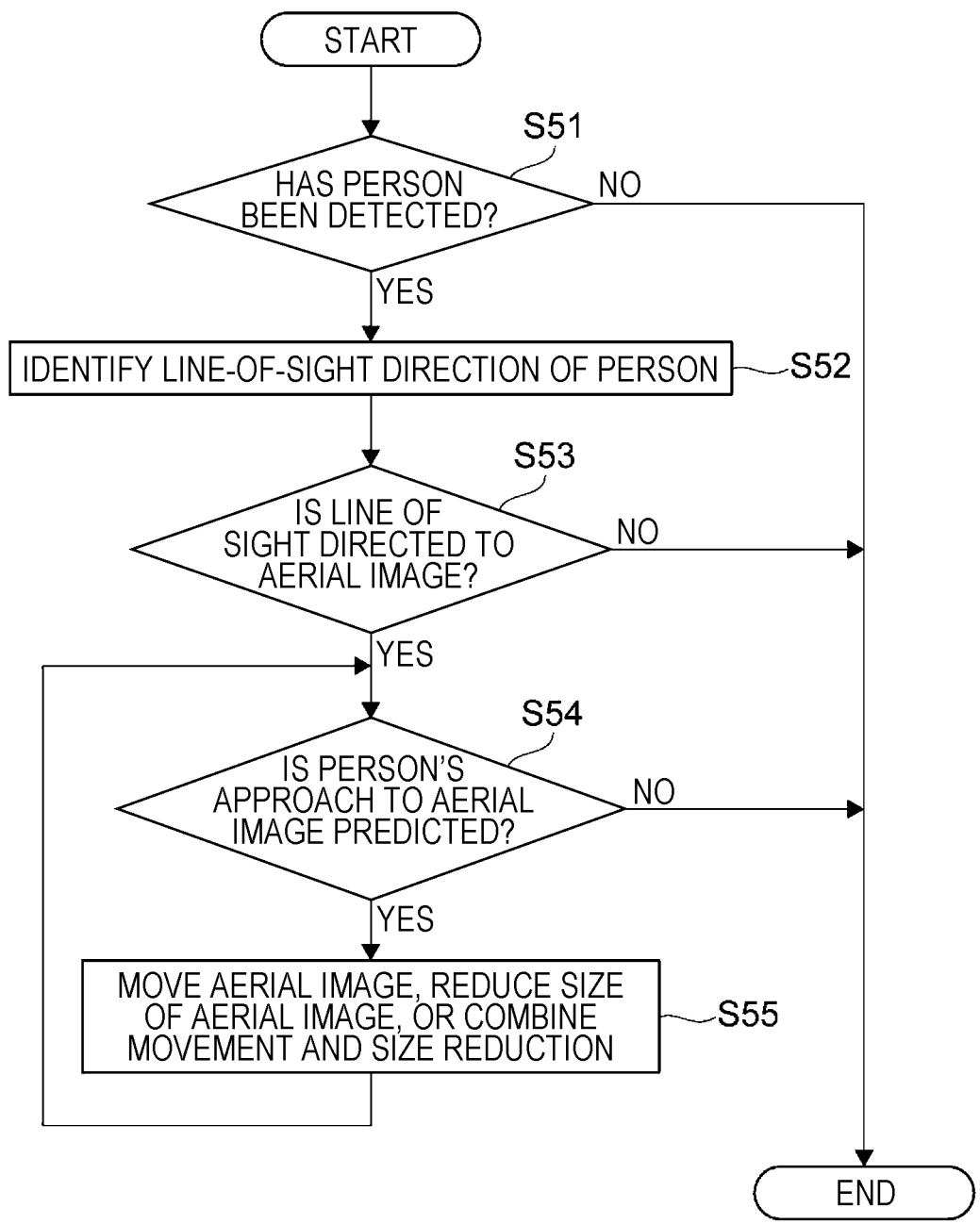
FIG. 29 is a flowchart for describing an overview of a processing operation to be executed by an image formation control part.

FIG. 29 is a flowchart for describing an overview of a processing operation to be executed by the image formation control part 65 (see FIG. 23). Because of the overview, details differ depending on individual styles of use.

First, the image formation control part 65 determines whether a person has been detected (Step S51). This determination is also implemented through the analysis of a captured image. The number of detected persons may be zero, one, or plural.

When the result of Step S51 is NO, the image formation control part 65 terminates the processing. The image formation control part 65 may repeat the determination of Step S51 until a person is detected.

When the result of Step S51 is YES, the image formation control part 65 identifies a direction of the line of sight of the detected person through the analysis of the captured image (Step S52).

Next, the image formation control part 65 determines whether the identified line of sight is directed to an aerial image (Step S53). This is because the visibility does not decrease and need not be increased even if a person who is not looking at the aerial image overlaps the aerial image.

When the result of Step S53 is NO, the image formation control part 65 terminates the processing.

When the result of Step S53 is YES, the image formation control part 65 determines whether approach of the target person to the aerial image is predicted (Step S54). The approach includes a case in which the aerial image is located in the moving direction as well as the case in which the aerial image and the person actually overlap each other.

It is desirable that the prediction be limited within a predetermined time from the time of determination. For example, the prediction is limited within 3 seconds. This is because the moving direction of the person may change with time.

When the result of Step S54 is NO, the image formation control part 65 terminates the processing.

When the result of Step S54 is YES, the image formation control part 65 moves the aerial image, reduces the size of the aerial image, or combines the movement and the size reduction (Step S55). This operation is repeated until the result of Step S54 becomes NO.

The movement of the aerial image is similar to that of the fourth exemplary embodiment and therefore description thereof is omitted.

Seventh Exemplary Embodiment

<Schematic Configuration of Aerial Image Forming System>

Figure 30:
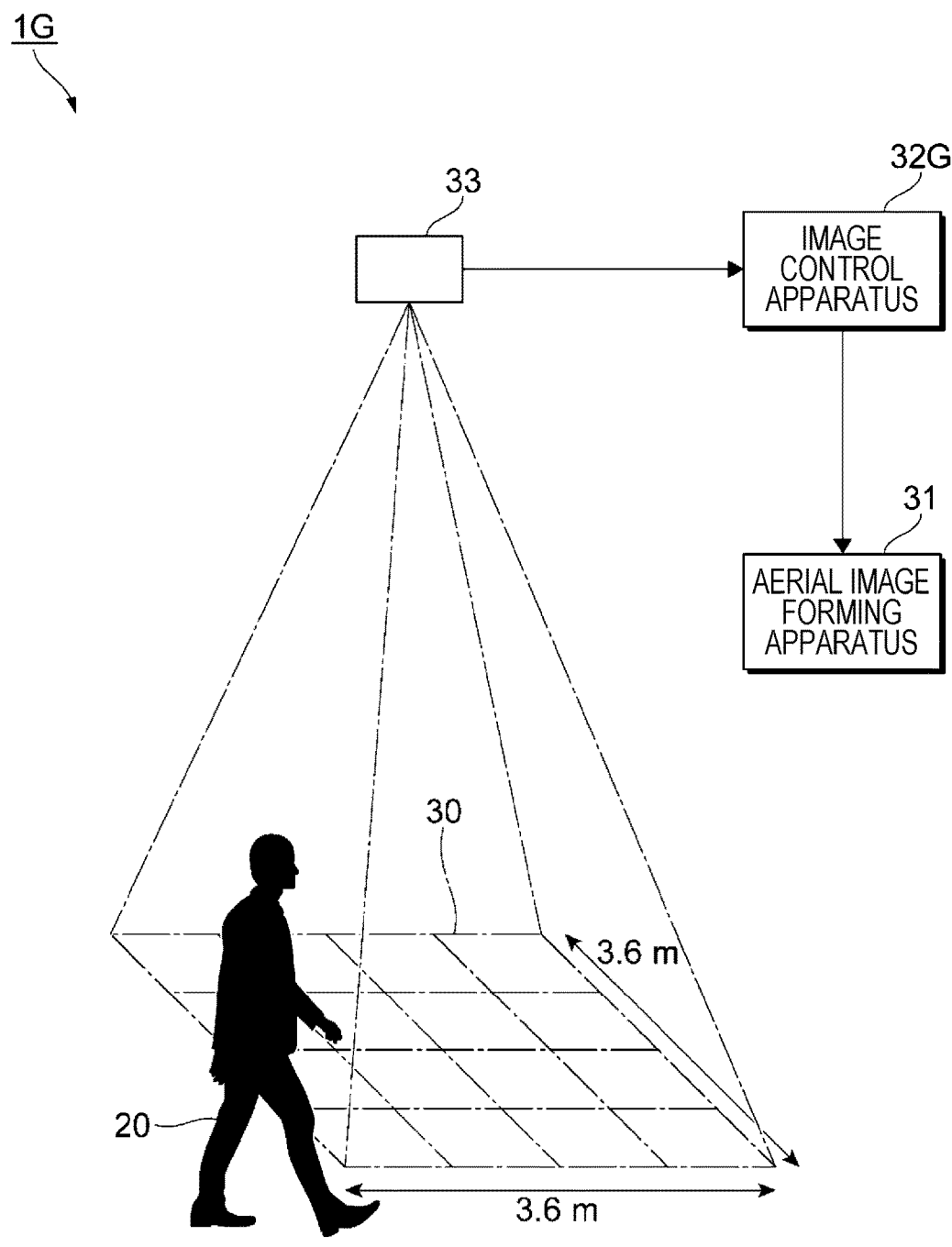
FIG. 30 illustrates the schematic configuration of an aerial image forming system according to a seventh exemplary embodiment.

FIG. 30 illustrates the schematic configuration of an aerial image forming system 1G according to a seventh exemplary embodiment. The aerial image forming system 1G is an example of the information processing system.

In FIG. 30, parts corresponding to those in FIG. 1 are denoted by the same reference symbols.

In this exemplary embodiment, before the aerial image is formed, the position where the aerial image will be formed is determined so as to prevent an overlap with the person 20. Therefore, the aerial image has not been rendered in FIG. 30.

The aerial image forming system 1G includes the aerial image forming apparatus 31 that forms the aerial image in the air, the person detecting sensor 33 that defines the detection plane 30 including a position where the aerial image 10 will be formed, and an image control apparatus 32G that determines the position where the aerial image will be formed based on the position of the person 20 detected by the person detecting sensor 33.

The image control apparatus 32G is an example of the controller and is also an example of the information processing apparatus.

Both the hardware configuration and the functional configuration of the image control apparatus 32G are similar to those of the first exemplary embodiment (see FIG. 7 and FIG. 8). That is, the image control apparatus 32G functions as the position detecting part 60 (see FIG. 8) and the image formation control part 61 (see FIG. 8) through execution of a program.

Figure 31:
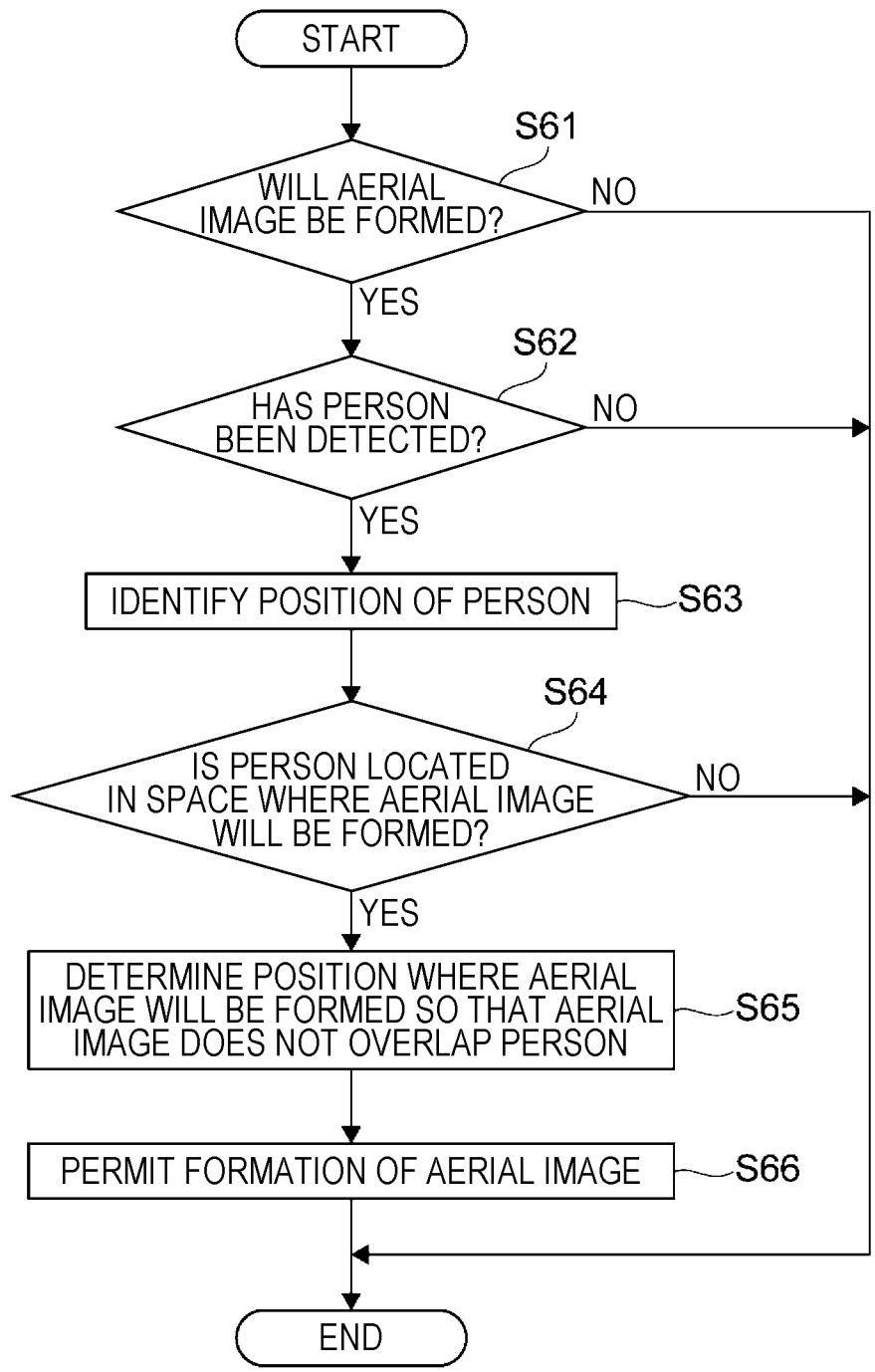
FIG. 31 is a flowchart for describing an overview of a processing operation to be executed by an image formation control part.

FIG. 31 is a flowchart for describing an overview of a processing operation to be executed by the image formation control part 61 (see FIG. 8). Because of the overview, details differ depending on individual styles of use.

First, the image formation control part 61 determines whether an aerial image will be formed (Step S61). The reason is that this exemplary embodiment is provided in order to execute processing before the aerial image is formed. Another reason is that there is no need to execute the following processing if the aerial image is not formed.

Examples of the case in which the aerial image will be formed include a case in which the aerial image forming apparatus 31 (FIG. 30) is activated or reactivated, a case in which the aerial image forming apparatus 31 recovers from a sleep mode, and a case in which an instruction is made to form an aerial image in a pop-up format.

When the result of Step S61 is NO, the image formation control part 61 terminates the processing.

When the result of Step S61 is YES, the image formation control part 61 determines whether a person has been detected (Step S62). The number of detected persons may be zero, one, or plural.

When the result of Step S62 is NO, the image formation control part 61 terminates the processing. The image formation control part 61 may repeat the determination of Step S62 until a person is detected.

When the result of Step S62 is YES, the image formation control part 61 identifies the position of the person (Step S63).

Next, the image formation control part 61 determines whether the person is located in a space where the aerial image will be formed (Step S64).

When the result of Step S64 is NO, the image formation control part 61 terminates the processing.

When the result of Step S64 is YES, the image formation control part 61 determines the position where the aerial image will be formed so that the aerial image does not overlap the person (Step S65).

Then, the image formation control part 61 permits the formation of the aerial image (Step S66).

Figure 32:
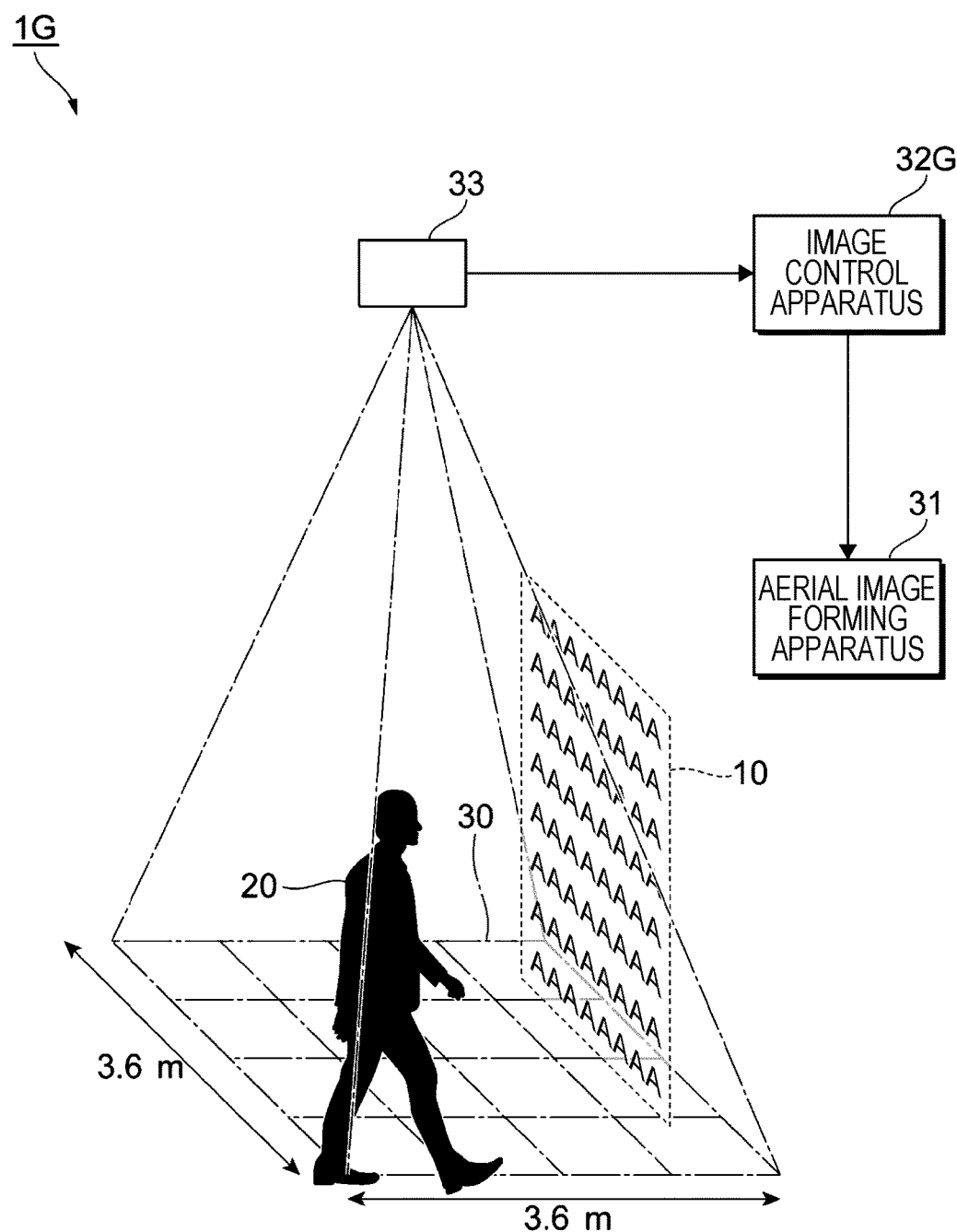
FIG. 32 illustrates an example in which an aerial image is formed at a position determined in advance based on a relationship with the position of a person.

FIG. 32 illustrates an example in which the aerial image 10 is formed at a position determined in advance based on a relationship with the position of the person.

In the case of FIG. 32, the aerial image 10 is formed at a position shifted from a position immediately below the person detecting sensor 33. Therefore, the aerial image 10 and the person 20 do not overlap each other simultaneously with the formation of the aerial image 10 and the visibility for the person 20 does not decrease.

Eighth Exemplary Embodiment

<Schematic Configuration of Aerial Image Forming System>

Figure 33:
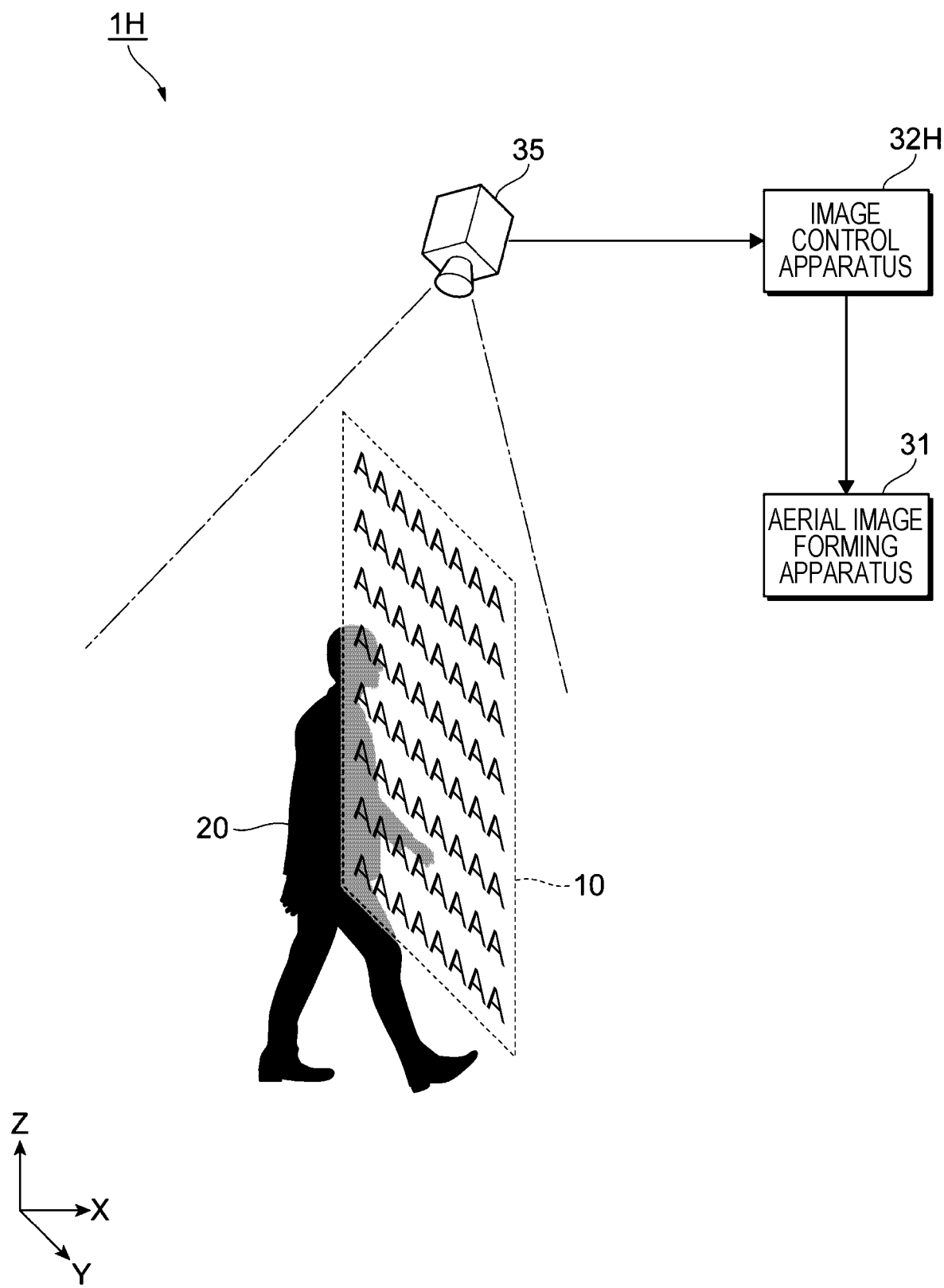
FIG. 33 illustrates the schematic configuration of an aerial image forming system according to an eighth exemplary embodiment.

FIG. 33 illustrates the schematic configuration of an aerial image forming system 1H according to an eighth exemplary embodiment. The aerial image forming system 1H is an example of the information processing system.

In FIG. 33, parts corresponding to those in FIG. 21 are denoted by the same reference symbols.

In this exemplary embodiment, an action of the person 20 is analyzed based on a captured image and the position where the aerial image 10 is formed is moved when the person 20 takes an action of keeping away from the aerial image 10 (for example, an action of bending backward). The reason is as follows. When the person 20 passes through the aerial image 10, there is no need to consider the decrease in the visibility of the aerial image 10. When the person 20 takes at least the action of keeping away from the aerial image 10, the person 20 is aware of the aerial image 10 and there is a high possibility that the person 20 continues to recognize the aerial image 10.

The aerial image forming system 1H includes the aerial image forming apparatus 31 that forms the aerial image 10 in the air, the image capturing camera 35 that captures an image of the space including the position where the aerial image 10 is formed, and an image control apparatus 32H that controls the position where the aerial image 10 is formed based on a result of the analysis of the captured image.

The image control apparatus 32H is an example of the controller and is also an example of the information processing apparatus.

Both the hardware configuration and the functional configuration of the image control apparatus 32H are similar to those of the fourth exemplary embodiment (see FIG. 22 and FIG. 23). That is, the image control apparatus 32H functions as the image analyzing part 64 (see FIG. 23) and the image formation control part 65 (see FIG. 23) through execution of a program.

Figure 34:
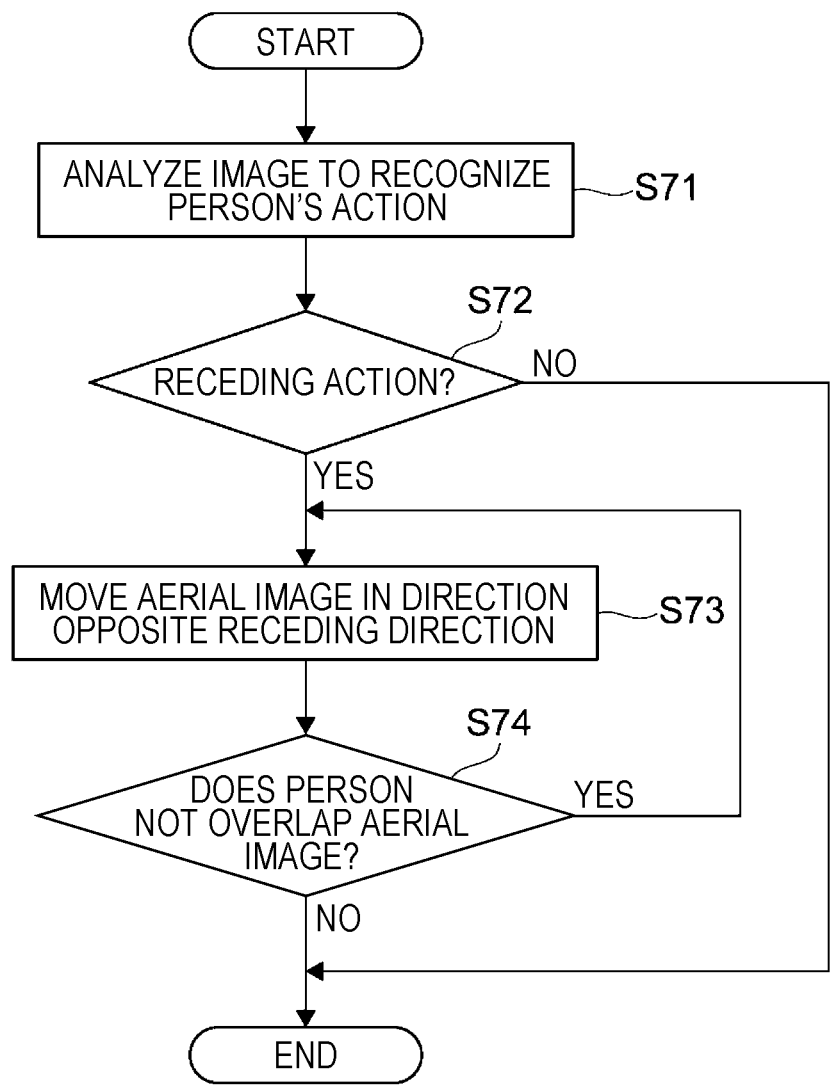
FIG. 34 is a flowchart for describing an overview of a processing operation to be executed by an image formation control part.

FIG. 34 is a flowchart for describing an overview of a processing operation to be executed by the image formation control part 65 (see FIG. 23). Because of the overview, details differ depending on individual styles of use.

First, the image formation control part 65 analyzes an image captured by the image capturing camera 35 to recognize an action of a person (Step S71).

Next, the image formation control part 65 determines whether the recognized action is a receding action (Step S72). Examples of the receding action include an action of bending backward and an action of stepping backward. The determination may be made based on the degree of match between the recognized action and the receding action or by using so-called artificial intelligence.

When the result of Step S72 is NO, the image formation control part 65 terminates the processing.

When the result of Step S72 is YES, the image formation control part 65 moves an aerial image in a direction opposite the receding direction (Step S73).

Next, the image formation control part 65 determines whether the person does not overlap the aerial image (Step S74).

While the result of Step S74 is YES, the image formation control part 65 continues the movement in Step S73.

When the result of Step S74 becomes NO, the image formation control part 65 terminates the processing.

Figure 35:
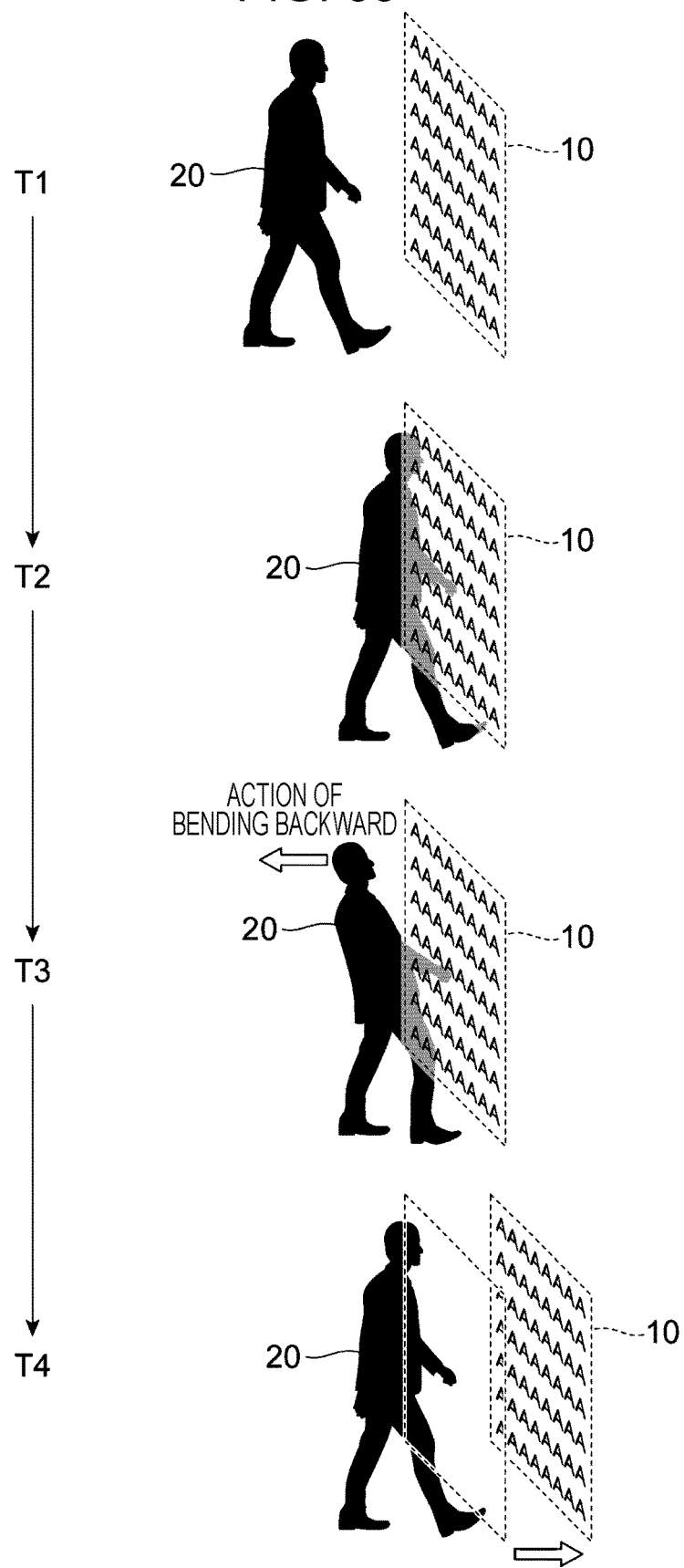
FIG. 35 illustrates an example in which formation of an aerial image is controlled when a receding action of a person has been detected.

FIG. 35 illustrates an example in which the formation of the aerial image 10 is controlled when the receding action of the person 20 has been detected.

A time T1 indicates a state in which the aerial image 10 and the person 20 do not overlap each other.

A time T2 indicates a state in which the aerial image 10 and the person 20 overlap each other. At the time T2, the person 20 may merely pass through the aerial image 10. In this exemplary embodiment, the aerial image 10 is not moved even when the overlap has been detected.

A time T3 indicates a state in which the person 20 takes an action of bending backward. This action may occur, for example, when the person 20 has excessively approached the aerial image 10.

A time T4 indicates a state in which the position where the aerial image 10 is formed is moved away from the person 20 in response to detection of the action of bending backward.

In this exemplary embodiment, the aerial image 10 is moved when it is detected that the person 20 takes an action of keeping away from the aerial image 10. Therefore, there is no need to consider the state in which the person 20 actually overlaps the aerial image 10.

Thus, even if an action of bending backward is detected at the time T1, the aerial image 10 is moved.

Also in this exemplary embodiment, the reduction of the dimensions of the aerial image 10 may be combined with the movement of the aerial image 10 or may be executed alone.

Ninth Exemplary Embodiment

<Schematic Configuration of Aerial Image Forming System>

Figure 36:
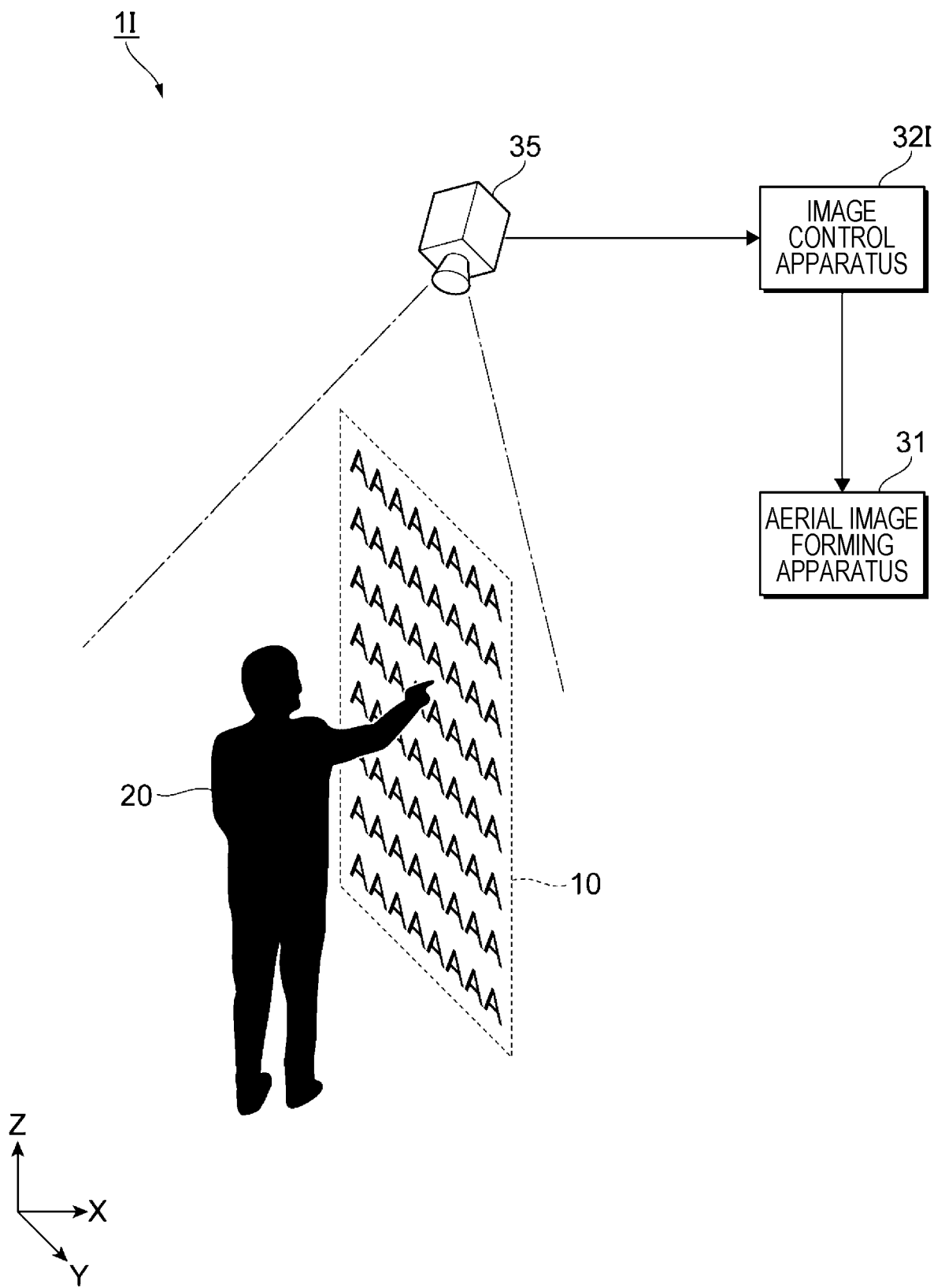
FIG. 36 illustrates the schematic configuration of an aerial image forming system according to a ninth exemplary embodiment.

FIG. 36 illustrates the schematic configuration of an aerial image forming system 1I according to a ninth exemplary embodiment. The aerial image forming system 1I is an example of the information processing system.

In FIG. 36, parts corresponding to those in FIG. 21 are denoted by the same reference symbols.

In this exemplary embodiment, it is assumed that the aerial image 10 is provided as an operation screen.

When the aerial image 10 is provided as an operation screen, a fingertip that is used for an operation naturally overlaps the aerial image 10. When the aerial image 10 is moved in this case, the operation may fail.

When the aerial image 10 is provided as an operation screen but the person 20 overlaps the aerial image 10 at a part other than the fingertip (for example, the head, arm, or body of the person), there is a high possibility that the person 20 overlaps the aerial image 10 unintendedly.

In this exemplary embodiment, the formation of the aerial image 10 is controlled while distinguishing an intended overlap of the person 20 and an unintended overlap of the person 20.

The aerial image forming system 1I includes the aerial image forming apparatus 31 that forms the aerial image in the air, the image capturing camera 35 that captures an image of the space including the position where the aerial image 10 is formed, and an image control apparatus 32I that controls the position where the aerial image 10 is formed based on a result of the analysis of the captured image.

The image control apparatus 32I is an example of the controller and is also an example of the information processing apparatus.

Both the hardware configuration and the functional configuration of the image control apparatus 32I are similar to those of the fourth exemplary embodiment (see FIG. 22 and FIG. 23). That is, the image control apparatus 32I functions as the image analyzing part 64 (see FIG. 23) and the image formation control part 65 (see FIG. 23) through execution of a program.

Figure 37:
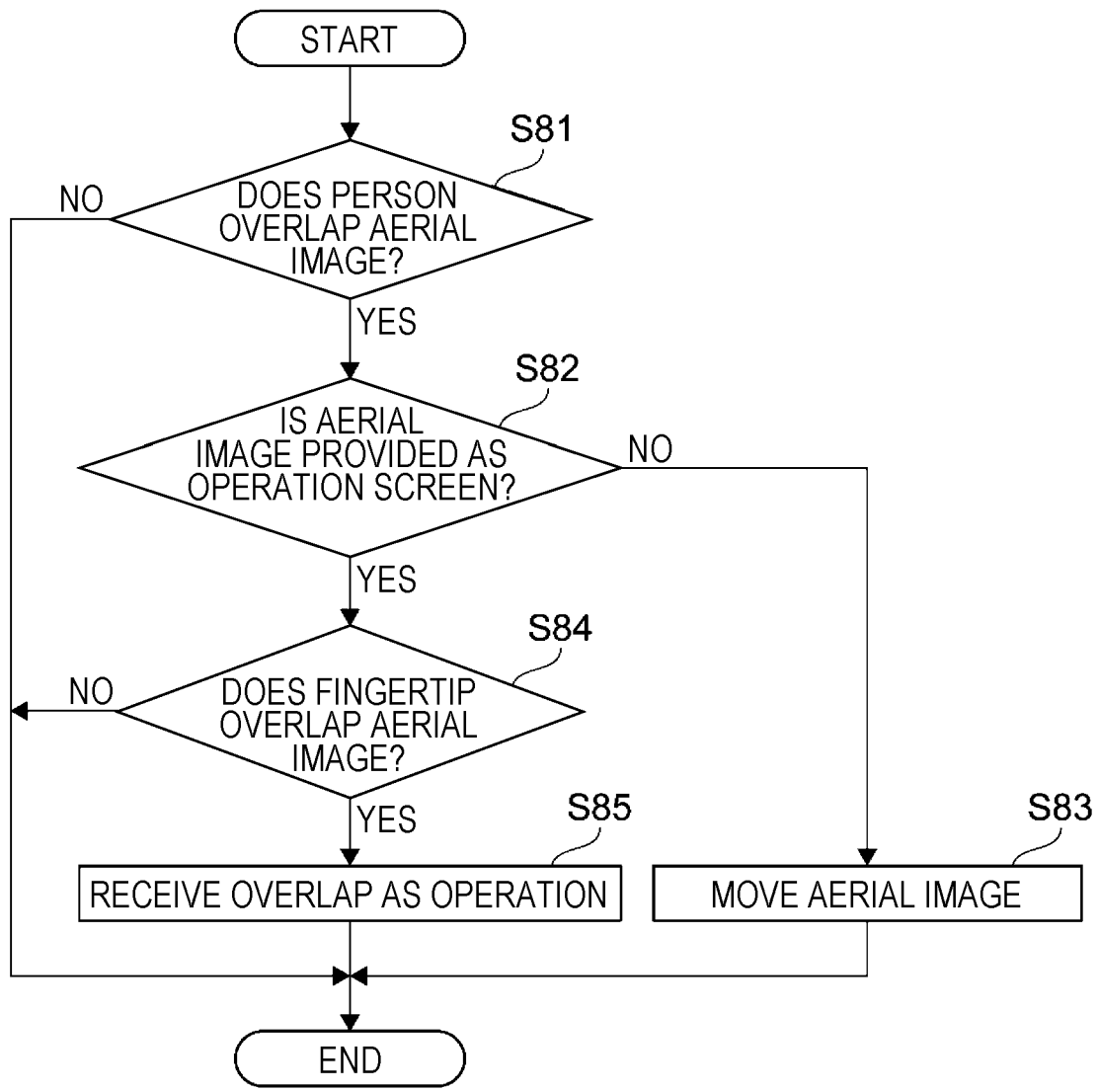
FIG. 37 is a flowchart for describing an overview of a processing operation to be executed by an image formation control part.

FIG. 37 is a flowchart for describing an overview of a processing operation to be executed by the image formation control part 65 (see FIG. 23). Because of the overview, details differ depending on individual styles of use.

First, the image formation control part 65 determines whether a person overlaps an aerial image (Step S81).

When the result of Step S81 is NO, the image formation control part 65 terminates the processing.

When the result of Step S81 is YES, the image formation control part 65 determines whether the aerial image is provided as an operation screen (Step S82).

When the result of Step S82 is NO, the image formation control part 65 moves the aerial image (Step S83). This is because there is a high possibility that the visibility decreases. As in the eighth exemplary embodiment, the aerial image may be moved when it is detected that the person takes an action of keeping away from the aerial image.

When the result of Step S82 is YES, the image formation control part 65 determines whether a fingertip overlaps the aerial image (Step S84). This is because, when the aerial image is provided as an operation screen but the person overlaps the aerial image at a part other than the fingertip, the overlap is regarded as an unintended overlap.

When the result of Step S84 is NO, the image formation control part 65 terminates the processing. This is because there is a high probability that the person does not intend to recognize the aerial image when the person overlaps the aerial image provided as the operation screen at a part other than the fingertip (for example, the head or body).

When the result of Step S84 is YES, the image formation control part 65 receives the overlap as an operation (Step S85).

Tenth Exemplary Embodiment

The exemplary embodiments described above are intended for the case in which the aerial image forming apparatus is a stationary apparatus (including a case in which the body of the apparatus is moved in order to move the position of the aerial image). The aerial image forming apparatus may be provided as an apparatus having a high degree of freedom in terms of portability.

Figure 38:
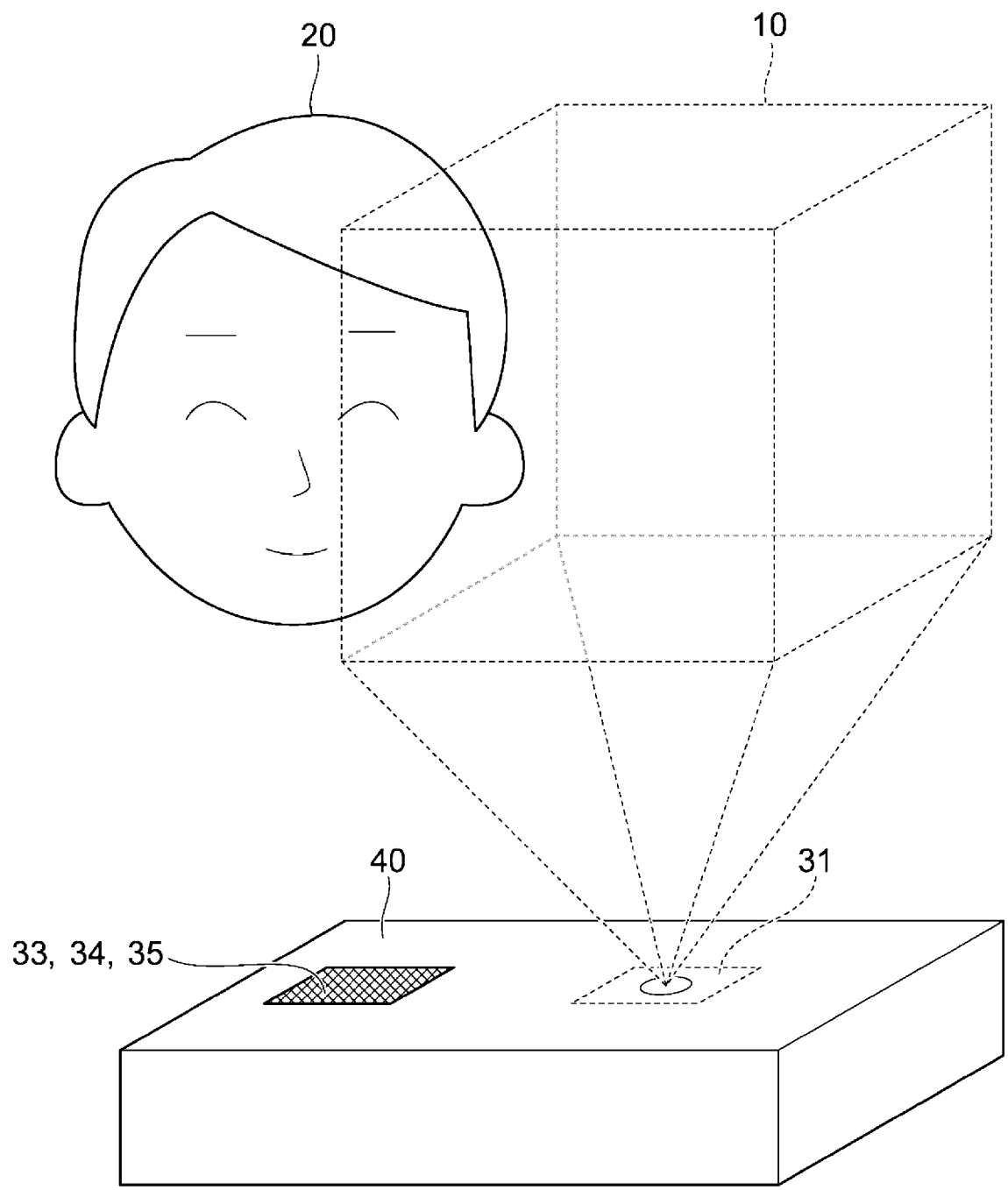
FIG. 38 illustrates a portable information processing apparatus in which an aerial image forming apparatus is mounted.

FIG. 38 illustrates a portable information processing apparatus 40 in which the aerial image forming apparatus 31 is mounted.

The information processing apparatus 40 of FIG. 38 is assumed to be a notebook computer, a smartphone, a video game console, an electronic dictionary, or other apparatuses to be used while being placed at an arbitrary position such as a desk or a floor.

Examples of the aerial image forming apparatus 31 to be used herein include an apparatus that forms the aerial image 10 by condensing a pulsed laser beam in the air.

For example, the information processing apparatus 40 includes the person detecting sensor 33 to be used for detecting the position of the person 20, the distance sensor 34 that detects a distance to the person 20, or the image capturing camera 35 that detects an overlap between the person 20 and the aerial image 10. The information processing apparatus 40 is not limited to a case in which any one of the sensors is mounted in the information processing apparatus 40. Plural sensors may be mounted in the information processing apparatus 40.

In the example of FIG. 38, the formed aerial image 10 overlaps the face of the person 20. In the case of the portable apparatus, the apparatus and the person 20 are close to each other and the person 20 is likely to overlap the formed aerial image 10.

Unlike the formation of the aerial image 10 by the stationary aerial image forming apparatus 31, this type of apparatus has a feature in that the aerial image 10 is formed in the air every time the apparatus is used. Therefore, it is difficult for the person 20 to predict the range of the space in which the aerial image 10 is generated.

Figure 39:
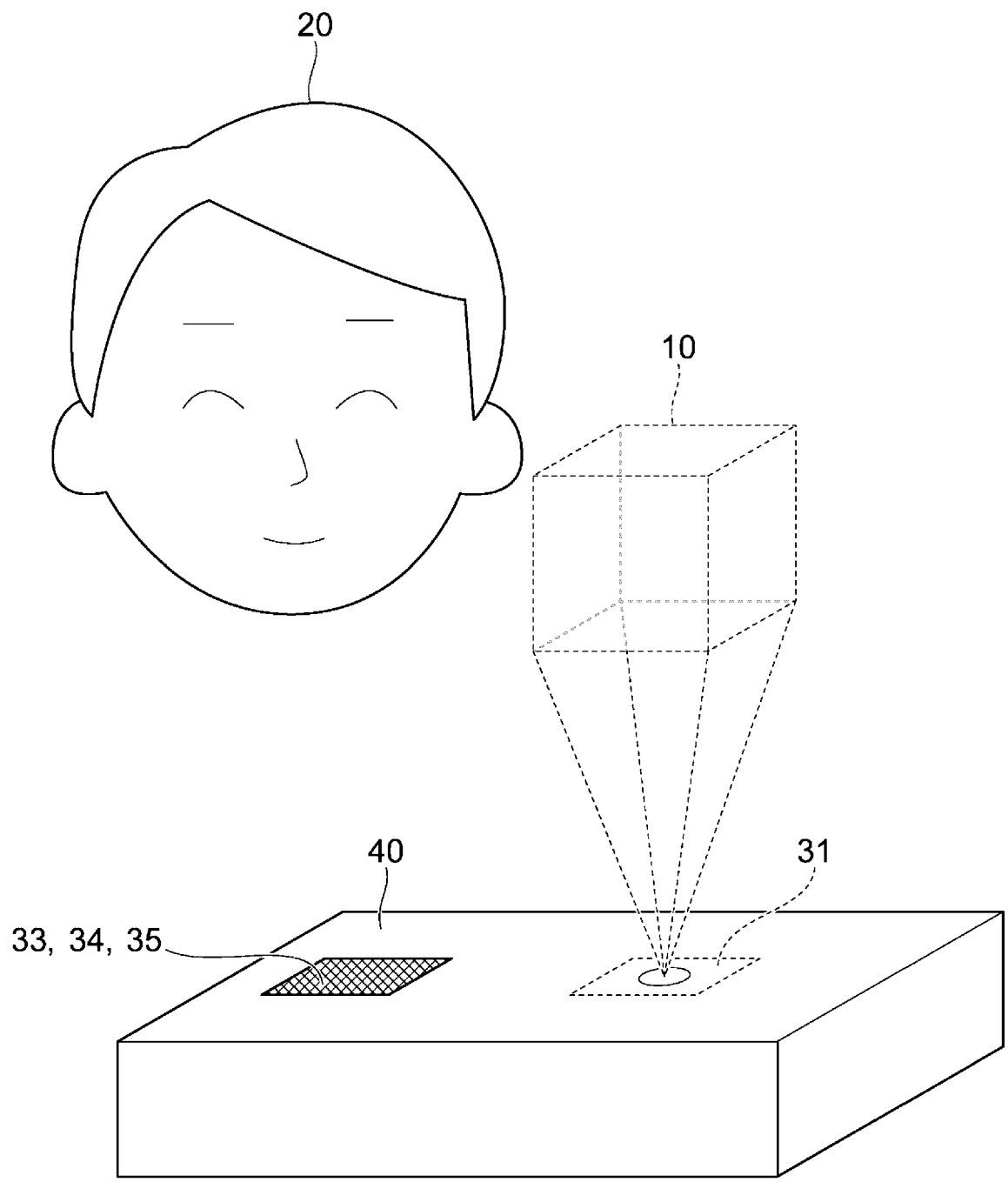
FIG. 39 illustrates a state in which the dimensions of an aerial image are reduced so as to avoid an overlap with a person.

FIG. 39 illustrates a state in which the dimensions of the aerial image 10 are reduced so as to avoid an overlap with the person 20.

In FIG. 39, the volume of the cubic aerial image 10 is controlled to be smaller than the volume of the aerial image 10 illustrated in FIG. 38.

The technologies of the exemplary embodiments described above may be applied to this control. For example, the technology that uses a positional relationship between the information processing apparatus 40 and the person 20, the technology that uses a relationship of the distance between the information processing apparatus 40 and the person 20, or the technology for analyzing an image captured by the image capturing camera 35 may be used.

As in the seventh exemplary embodiment, the control for reducing the size of the aerial image 10 or the control for moving the position where the aerial image 10 is formed may be determined before the aerial image 10 is formed.

Other Exemplary Embodiments

The first to ninth exemplary embodiments described above are directed to the case in which the aerial image 10 is only formed into a planar shape. As described in the tenth exemplary embodiment (see FIG. 38 and FIG. 39), the first to ninth exemplary embodiments are also applicable to the case in which the aerial image 10 is formed as a three-dimensional image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
at least one sensor configured to detect a position of a user; and
a controller that, upon detection of the position of the user by the at least one sensor, is configured to control formation of an image to be formed in air so as to move the image from a first location to a second location, the first location being a location that overlaps the user at a predetermined area or would be predicted by the controller to overlap the user at the predetermined area, the second location being a location that does not overlap the user at the predetermined area.

2. The information processing apparatus according to claim 1, wherein the controller is configured to reduce a display size of the image.

3. The information processing apparatus according to claim 1, wherein the image is moved while keeping inclination of a display surface of the image before movement.

4. The information processing apparatus according to claim 1, wherein the image is moved so that inclination of a display surface of the image before movement is changed.

5. The information processing apparatus according to claim 1, wherein the controller is configured to detect an overlap between the user and the image formed in the air by processing a captured image that shows the image formed in the air.

6. The information processing apparatus according to claim 1, wherein, before the image is formed in the air, the controller is configured to capture an image of a space where the image will be formed in the air and to detect whether the user is located in the space where the image will be formed in the air.

7. The information processing apparatus according to claim 1, wherein, when approach of the user to the image is predicted, the controller is configured to perform control so that the image does not overlap the user.

8. The information processing apparatus according to claim 7, wherein, when a line of sight of the user is directed to the image, the controller performs the control so that the image does not overlap the user.

9. The information processing apparatus according to claim 7, wherein, when the user is moving in a direction to the image, the controller performs the control so that the image does not overlap the user.

10. The information processing apparatus according to claim 1, wherein the controller is configured to control the formation of the image based on a distance between the user and a space where the image is displayed.

11. The information processing apparatus according to claim 1, wherein the controller is configured to control the formation of the image based on a distance between the user and an image forming unit that forms the image.

12. The information processing apparatus according to claim 1, wherein, when the user takes an action of keeping away from the image, the controller performs control so that the image does not overlap the user.

13. The information processing apparatus according to claim 1, wherein, when the image is provided as an operation screen, the control is disabled.

14. An information processing system, comprising:
an image forming unit that forms an image in air;
at least one sensor configured to detect a position of a user; and
a controller that, upon detection of the position of the user by the at least one sensor, is configured to control formation of the image so as to move the image from a first location to a second location, the first location being a location that overlaps the user at a predetermined area or would be predicted by the controller to overlap the user at the predetermined area, the second location being a location that does not overlap the user at the predetermined area.

15. A non-transitory computer readable medium storing a program causing a computer to execute a process comprising:
- detecting a position of a user; and
- upon detection of the position of the user, controlling formation of an image to be formed in air so as to move the image from a first location to a second location, the first location being a location that overlaps the user at a predetermined area or would be predicted by the controller to overlap the user at the predetermined area, the second location being a location that does not overlap the user at the predetermined area.

* * * * *